(12) United States Patent
Ohura et al.

(10) Patent No.: US 10,968,845 B2
(45) Date of Patent: Apr. 6, 2021

(54) CONTROL DEVICE FOR COMPRESSION IGNITION ENGINE

(71) Applicant: Mazda Motor Corporation, Hiroshima (JP)

(72) Inventors: Takuya Ohura, Aki-gun (JP); Keiji Maruyama, Aki-gun (JP); Toru Miyamoto, Aki-gun (JP); Kouji Hadama, Aki-gun (JP); Masataka Sumita, Aki-gun (JP); Takahiro Izaki, Aki-gun (JP); Shinji Takayama, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 16/782,328

(22) Filed: Feb. 5, 2020

(65) Prior Publication Data

US 2020/0362778 A1    Nov. 19, 2020

(30) Foreign Application Priority Data

May 17, 2019    (JP) .............................. JP2019-093957

(51) Int. Cl.
*F02D 37/02*    (2006.01)
*F02B 5/00*    (2006.01)
(Continued)

(52) U.S. Cl.
CPC .............. *F02D 37/02* (2013.01); *F02B 5/00* (2013.01); *F02B 9/02* (2013.01); *F02D 9/08* (2013.01);
(Continued)

(58) Field of Classification Search
CPC .......... F02D 37/02; F02D 41/401; F02D 9/08; F02D 2200/021; F02P 5/045; F02B 9/02; F02B 5/00; F02M 61/14
See application file for complete search history.

(56) References Cited

U.S. PATENT DOCUMENTS

2006/0201475 A1    9/2006  Shiraishi
2010/0241341 A1*   9/2010  Yun ...................... F02B 17/005
                                                        701/113
(Continued)

FOREIGN PATENT DOCUMENTS

JP          4691373 B2    6/2011
JP         2018084183 A   5/2018

*Primary Examiner* — Xiao En Mo
(74) *Attorney, Agent, or Firm* — Alleman Hall Creasman & Tuttle LLP

(57) ABSTRACT

A control device is provided for a compression ignition engine, which controls so that partial compression ignition combustion of A/F-lean mixture gas is carried out in a specific range where an engine load is low. In a first range of the specific range, a normal ignition in which sparks are generated in a late period of compression stroke or an early period of expansion stroke to start SI combustion, and a preceding ignition in which sparks are generated at a timing included in intake stroke or compression stroke and earlier than the normal ignition by a given amount or more are performed, and fuel is injected at a timing where fuel is present before the preceding ignition inside the combustion chamber. In a high-load side second range of the specific range, at least the normal ignition is performed and the execution of the preceding ignition is limited.

10 Claims, 13 Drawing Sheets

(51) Int. Cl.
*F02B 9/02* (2006.01)
*F02D 9/08* (2006.01)
*F02D 41/40* (2006.01)
*F02M 61/14* (2006.01)
*F02P 5/04* (2006.01)

(52) U.S. Cl.
CPC ........... *F02D 41/401* (2013.01); *F02M 61/14* (2013.01); *F02P 5/045* (2013.01); *F02D 2200/021* (2013.01)

(56) References Cited

U.S. PATENT DOCUMENTS

| | | | |
|---|---|---|---|
| 2014/0230786 A1* | 8/2014 | Ravi | F02D 41/3035 123/406.52 |
| 2019/0107040 A1 | 4/2019 | Tsumura | |

* cited by examiner

CONTROL DEVICE FOR COMPRESSION IGNITION ENGINE

TECHNICAL FIELD

The present disclosure relates to a device which controls an engine capable of carrying out partial compression ignition combustion in which spark ignition (SI) combustion of a portion of a mixture gas is performed by a jump-spark ignition, and compression ignition (CI) combustion of the remaining mixture gas is performed by a self-ignition.

BACKGROUND OF THE DISCLOSURE

In recent years, Homogeneous-Charged Compression Ignition (HCCI) combustion in which gasoline fuel mixed with air is combusted inside a combustion chamber by self-ignition has attracted attention. Since HCCI combustion is a mode in which a mixture gas combusts at a plurality of positions simultaneously, it is said that the combustion rate of the mixture gas is fast, and it is very advantageous with respect to fuel efficiency (thermal efficiency), compared with SI combustion (jump-spark ignition combustion) adopted in normal gasoline engines. However, HCCI combustion has problems such as the combustion start timing of the mixture gas (a timing at which the mixture gas self-ignites) changes largely by external factors such as temperature, and it is difficult to be controlled during a transitional operation in which the load changes suddenly.

Thus, it is proposed that, without combusting all the mixture gas by the self-ignition, a portion of the mixture gas is combusted by a jump-spark ignition using an ignition plug. That is, a portion of the mixture gas is forcibly combusted by flame propagation which is triggered by the jump-spark ignition (SI combustion), and the remaining mixture gas is combusted by the self-ignition (CI combustion). Below, such combustion is referred to as partial compression ignition combustion.

As one example of the engine which adopts the partial compression ignition combustion, JP2018-084183A is known as follows. In detail, in the engine disclosed in JP2018-084183A, an exhaust gas recirculation (EGR) rate inside a combustion chamber, a timing of a jump-spark ignition by the ignition plug, etc. are controlled, during an execution of the partial compression ignition combustion (in this document, it is referred to as "SI-CI combustion"), so that a SI ratio which is a ratio of an amount of heat release caused by SI combustion to the total amount of heat release in one cycle reaches a target value (target SI ratio) determined according to the engine load (target torque).

On the other hand, an improvement in thermal efficiency of an engine by another method without using compression ignition combustion has also been proposed. For example, JP4691373B2 discloses a jump-spark ignition engine in which an ignition plug performs two jump-spark ignitions in one cycle. In detail, this jump-spark-ignition engine performs during a compression stroke a preceding ignition (preliminary preceding ignition), which gives a small electric discharge energy with which an ignition and combustion of the entire mixture gas inside a combustion chamber do not take place (a source of a flame may be formed locally), and then performs a normal ignition (main ignition) which gives a larger electric discharge energy than the preceding ignition at a proper timing which is later than the preceding ignition. Thus, by forming the source of the flame by the preceding ignition in an earlier stage than the normal ignition, a misfire of the mixture gas can be prevented and the combustion rate can be increased.

Here, in the partial compression ignition combustion, the combustion rate of CI combustion influences thermal efficiency. Since CI combustion is a phenomenon in which a fuel component carries out a spontaneous chemical reaction, it can be said that its combustion rate is originally faster than SI combustion in which a combustion area expands gradually by flame propagation. However, for example, if the fuel can be modified to be highly reactive fuel before the CI combustion, the combustion rate of CI combustion further increases to further improve thermal efficiency, thereby establishing both fuel efficiency and torque performance.

The fuel property modification for increasing the reactivity may be achieved, for example, by increasing the temperature of the mixture gas to a given temperature range. That is, the high temperature of the mixture gas causes the fuel component (hydrocarbon) to be cleaved, and an intermediate product containing highly reactive OH radicals can be generated. As a way of increasing the temperature for such a fuel property modification (the generation of the intermediate product), the present inventors considered that the temperature of the mixture gas is increased by performing a plurality of jump-spark ignitions, i.e., performing the auxiliary preceding ignition before the normal ignition, for example, similar to JP4691373B2. However, according to the research of the present inventors, when the energy at which the portion of the mixture gas combusts is given by the preceding ignition like JP4691373B2, it is discovered that most of the intermediate product is consumed by the combustion, and therefore, the effect of speeding up the combustion rate of CI combustion cannot fully be acquired.

SUMMARY OF THE DISCLOSURE

The present disclosure is made in view of the above situations, and one purpose thereof is to provide a control device for a compression ignition engine capable of achieving partial compression ignition combustion which is fast in terms of combustion rate and excellent in thermal efficiency.

In order to solve the problems, the present inventors examined that, by performing the preceding ignition, under a condition where the temperature of a mixture gas is sufficiently low such as in an intake stroke, combustion of the mixture gas accompanying the preceding ignition is certainly prevented, and an amount of the intermediate product consumed during a period from the preceding ignition to the normal ignition is reduced. However, since the temperature rising width of the mixture gas required for carrying out a fuel property modification increases as the timing of the preceding ignition is advanced, the energy necessary for the preceding ignition increases. On the other hand, since the thermal load applied to the ignition plug increases as the energy of the preceding ignition increases, the durability of the ignition plug may be lowered. After experimenting based on such a viewpoint, the present inventors discovered that the meaning of the preceding ignition becomes weaker under the condition where the engine load is comparatively high, that is, a significant effect cannot be acquired in particular even if the preceding ignition is performed. Thus, the present inventors devised about suspending the preceding ignition under the high-load condition, and as the present inventors examined the durability of the ignition plug based on the suspension, they discovered that, if the preceding ignition is suspended under the high-load condition, the problem of the durability of the ignition plug does not become apparent in particular, even if sufficient energy is given by the preceding ignition for the fuel property modification under the other conditions, and conversely, the durability of the ignition plug is lowered substantively when the preceding ignition is continued in the same mode regardless of the load.

According to one aspect of the present disclosure, a control device for a compression ignition engine is provided. The engine includes a combustion chamber, an injector configured to inject fuel into the combustion chamber, and an ignition plug configured to ignite a mixture gas where the fuel injected from the injector is mixed with air. The control device includes an air amount adjusting mechanism configured to adjust an amount of air introduced into the combustion chamber, and a processor configured to execute a combustion controlling module to control the injector, the ignition plug, and the air amount adjusting mechanism so that partial compression ignition combustion, in which an air-fuel ratio (A/F)-lean mixture gas having an air-fuel ratio higher than a stoichiometric air-fuel ratio is formed inside the combustion chamber, spark ignition (SI) combustion of a portion of the mixture gas is performed by a jump-spark ignition using the ignition plug, and compression ignition (CI) combustion of the remaining mixture gas is performed by a self-ignition, is carried out in a specific range where the engine load is low. In a first range of the specific range excluding a part at least on a high-load side, the combustion controlling module causes the ignition plug to perform a normal ignition in which sparks are generated in a late period of a compression stroke or an early period of an expansion stroke to start the SI combustion, and a preceding ignition in which sparks are generated at a timing included in an intake stroke or the compression stroke and earlier than the normal ignition by a given amount or more, and causes the injector to inject fuel at a timing where fuel is present inside the combustion chamber before the preceding ignition. In a second range of the specific range where the engine load is higher than in the first range, the combustion controlling module at least performs the normal ignition and limits the execution of the preceding ignition.

Note that the "limiting the execution of the preceding ignition" in the present disclosure includes a mode of completely stopping the preceding ignition of course, but also a mode of reducing the energy of the preceding ignition while continuing the preceding ignition.

According to this configuration, during the operation in the first range, i.e., when the A/F-lean partial compression ignition combustion is performed under the condition where the engine load is relatively low, since the preceding ignition is performed at the timing where fuel is present inside the combustion chamber and earlier than the normal ignition by the given amount or more, the fuel component can be modified by the preceding ignition to generate an intermediate product including OH radicals, etc., thereby improving a thermal efficiency of the partial compression ignition combustion caused after the normal ignition. The preceding ignition performed at the timing sufficiently advanced from the normal ignition does not substantially cause the flame propagation of the mixture gas because of the insufficient temperature, but a layer of the mixture gas which is raised in temperature to the given temperature range of greater than or equal to 850 K and less than 1140 K is formed (high-temperature layer) around the sparks (arc) by the preceding ignition. Then, the fuel component (hydrocarbon) included in the high-temperature layer is cleaved to generate hydrogen peroxide ($H_2O_2$) and formaldehyde ($CH_2O$), and, for example, OH radicals are generated from these components.

OH radicals are strong in oxidation and highly reactive. Therefore, when the intermediate product containing such OH radicals are generated inside the combustion chamber after the preceding ignition, the combustion rate of CI combustion, i.e., a speed of the combustion by the spontaneous chemical reaction of the fuel component, can be increased, even during the operation in the first range where the ignitability of the mixture gas is not always appropriate, and therefore, the thermal efficiency of the partial compression ignition combustion including the CI combustion can be improved.

On the other hand, since the preceding ignition is limited in the second range on the high-load side of the first range, it can be prevented that the durability of the ignition plug is deteriorated by the excessive thermal load, etc. That is, in the second range, since the load is high and the total injection amount of fuel (as a result, the amount of heat release) increases, the in-cylinder temperature (the temperature inside the combustion chamber) tends to become high, and the ignitability of the mixture gas is secured comparatively appropriately. For this reason, it can be said that the combustion rate of CI combustion in the second range is originally fast, and therefore, the significance of performing the preceding ignition in such a second range is low. On the other hand, in this configuration, since the preceding ignition is limited in the second range, the thermal load of the ignition plug can be reduced while totally improving thermal efficiency in the specific range where the partial compression ignition combustion is performed, and therefore, the durability of the ignition plug can fully be secured.

The combustion controlling module may suspend the preceding ignition and only perform the normal ignition in the second range.

According to this configuration, when the preceding ignition is suspended in the second range where the engine load is high (the energy of the preceding ignition is set to zero), the thermal load of the ignition plug, etc. is securely reduced, and the durability can fully be secured.

According to the observation based on the research of the present inventors, the start timing of CI combustion may occasionally vary largely even in the second range where it is considered that the appropriate ignitability (the increasing in the rate of CI combustion) can be obtained without being accompanied by the preceding ignition. Since such a variation of CI combustion leads to instability in output torque, measures such as intentionally increasing a SI ratio (a ratio of an amount of heat release by SI combustion to the total amount of heat release during one cycle) are necessary, and the measures will cause a degradation in fuel efficiency. In order to address such a problem, the combustion controlling module may perform an intermittent ignition in which sparks are generated intermittently by suspending an electric discharge from the ignition plug for a very short period of time, as the normal ignition in the second range.

When the sparks are generated intermittently by the normal ignition in the second range in this manner, the period of time from the start to the end of electric discharge becomes longer, and as a result, the effect as if the generating time of sparks (arc) is substantially extended can be acquired, thereby stabilizing SI combustion which is the first stage of partial compression ignition combustion. Since the probability of the start timing of CI combustion falling in a range near the intended timing in the second range becomes high and partial compression ignition combustion is fully stabilized, fuel efficiency can be further improved.

The combustion controlling module may perform the preceding ignition so that the flame propagation of the mixture gas is not caused.

According to this configuration, the intermediate product generated by the preceding ignition is avoided from being consumed before the normal ignition (because of unintended flame propagation due to the preceding ignition).

The combustion controlling module may set energy of the preceding ignition in the first range constant, regardless of the engine load. Moreover, the combustion controlling module may set the timing of the preceding ignition in the first range constant, regardless of the engine load.

According to this configuration, when the energy and the timing of the preceding ignition in the first range are set constant regardless of the engine load, the control of the ignition plug can be simplified, and the effect of the preceding ignition (the improvement in thermal efficiency by the increasing in the rate of CI combustion) can be demonstrated at a significant level.

That is, the present inventors observed that the energy and the timing of the preceding ignition in the first range are set variably according to the engine speed and the load so that the effect of the preceding ignition becomes the maximum effect. However, as a result of the examination, it was confirmed that a significant effect could be acquired at any operation point in the first range, if the energy and the timing of the preceding ignition are fixed in a given combination. Because of such a situation, this configuration is suitable in which the energy and the timing of the preceding ignition in the first range are fixed regardless of the engine load. Therefore, since it becomes unnecessary to change the control for energizing the ignition plug for the preceding ignition each time according to the engine load, the effect of improving thermal efficiency, etc. by the preceding ignition can be acquired at the sufficient level, while simplifying the control of the ignition plug.

The combustion controlling module may perform the preceding ignition in a middle period or a late period of the intake stroke.

As a result of the examination by the present inventors, there is an observation that the efficiency of the fuel property modification by the preceding ignition improves as the timing of the preceding ignition is advanced as much as possible in an intake stroke, i.e., in an early period of the intake stroke. However, since the early period of the intake stroke is a period during which a gas flow inside the combustion chamber is very strong, if the preceding ignition is performed during this period, even though the energy consumption by the preceding ignition can be reduced, uneven wear of electrodes of the ignition plug resulting from the strong gas flow tends to occur, and therefore, the durability of the ignition plug may be deteriorated significantly. That is, if the preceding ignition is performed under the environment where the gas flow is strong like the early period of an intake stroke, the sparks (arc) discharged from the electrodes of the ignition plug are deformed by the influence of the gas flow inside the combustion chamber, and the grounding points of the arc are concentrated on a narrow area in the electrodes, etc., thereby easily stimulating the wear of the electrodes of the ignition plug. That is why the timing of the preceding ignition is set as early as possible while avoiding the early period of the intake stroke, that is, suitably in the middle period or the late period of the intake stroke.

However, if the timing of the preceding ignition is delayed to the middle period or the late period of the intake stroke, the efficiency of the fuel property modification by the preceding ignition itself is lowered. Thus, the energy of the preceding ignition is required to be set to a comparatively high value in order to compensate for the lowered efficiency. However, in this case, there is a concern that the thermal load of the ignition plug becomes excessive depending on the frequency of the preceding ignition, and the durability may be adversely influenced. On the other hand, according to this configuration, since the preceding ignition is limited (at least the energy of the ignition is reduced) in the second range where the engine load is relatively high, the thermal load of the ignition plug can be reduced and the deterioration of the durability of the ignition plug can be reduced to the minimum.

When the preceding ignition is performed in the middle period or the late period of the intake stroke as described above, a sufficient interval tends to be secured between the preceding ignition and the normal ignition. Thus, the preceding ignition and the normal ignition may be performed by a single ignition plug having a single ignition circuitry, per each cylinder of the engine.

According to this configuration, by a simple method using the existing ignition plug, the preceding ignition and the normal ignition can be performed.

The combustion controlling module may reduce the energy of the preceding ignition as an engine temperature increases, under a condition where the engine load is the same.

According to this configuration, the energy consumption by the preceding ignition can be suppressed, while maintaining the high thermal efficiency of the partial compression ignition combustion.

The combustion controlling module may adjust the timing of the normal ignition so that an SI ratio that is a ratio of an amount of heat release by the SI combustion to the total amount of heat release in one cycle reaches a target value determined beforehand.

In this manner, when the timing of the normal ignition is adjusted so as to achieve the partial compression ignition combustion suitable for the target value of the SI ratio (target SI ratio), the ratio of CI combustion can be increased (i.e., the SI ratio is lowered) as much as possible within the range where, for example, combustion noise does not become excessive. This leads to increasing thermal efficiency by the partial compression ignition combustion as much as possible, with the aid of the effect of the fuel property modification by the preceding ignition (increasing the rate of CI combustion).

BRIEF DESCRIPTION OF DRAWINGS

FIG. 12A illustrates a relationship between the engine load (engine speed) and the timing of the preceding ignition, and FIG. 12B illustrates a relationship between the engine load (engine speed) and the energy of the preceding ignition.

DETAILED DESCRIPTION OF THE DISCLOSURE

(1) Overall Configuration of Engine

Figure 1:
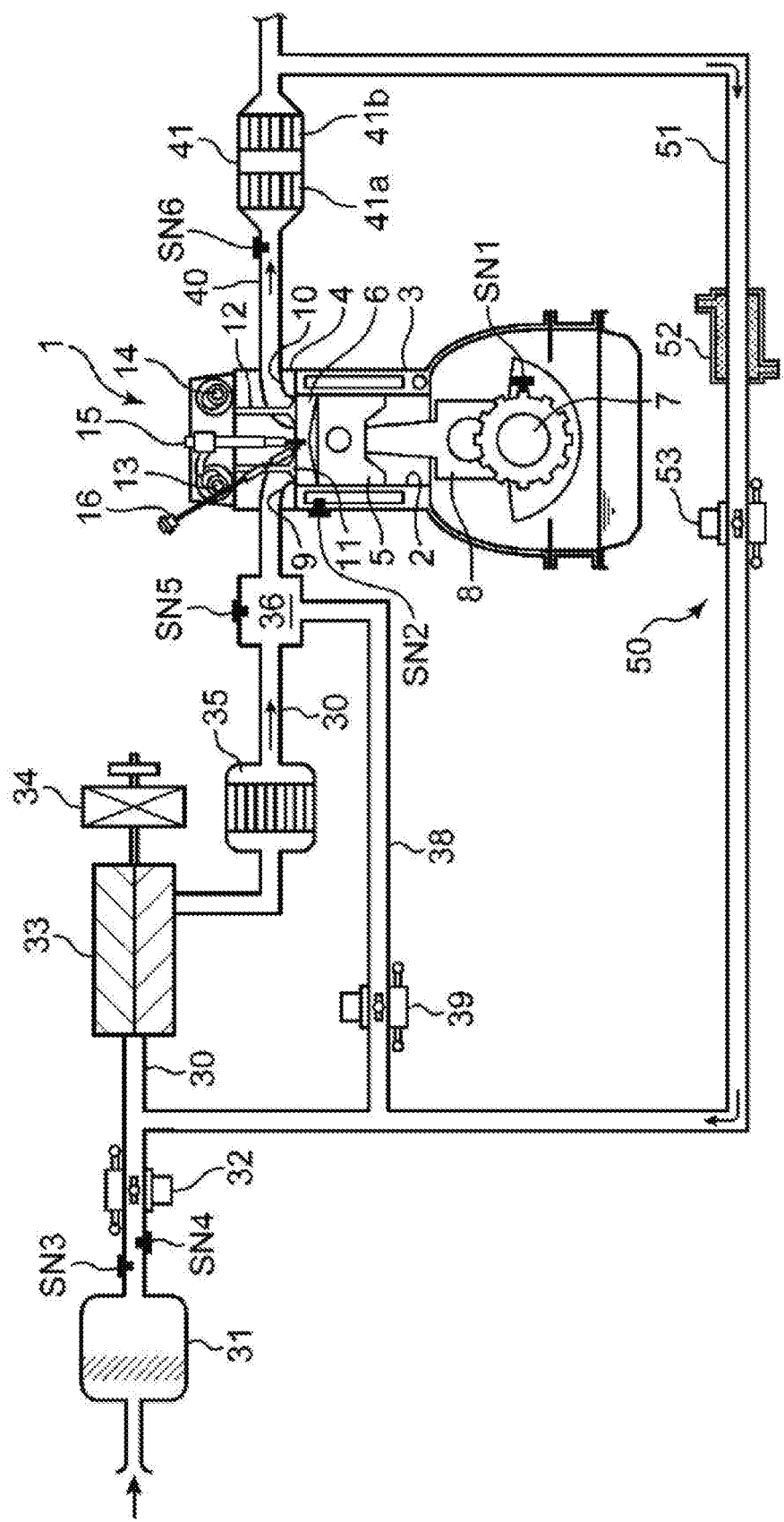
FIG. 1 is a system diagram schematically illustrating the overall configuration of a compression ignition engine according to one embodiment of the present disclosure.
Figure 2:
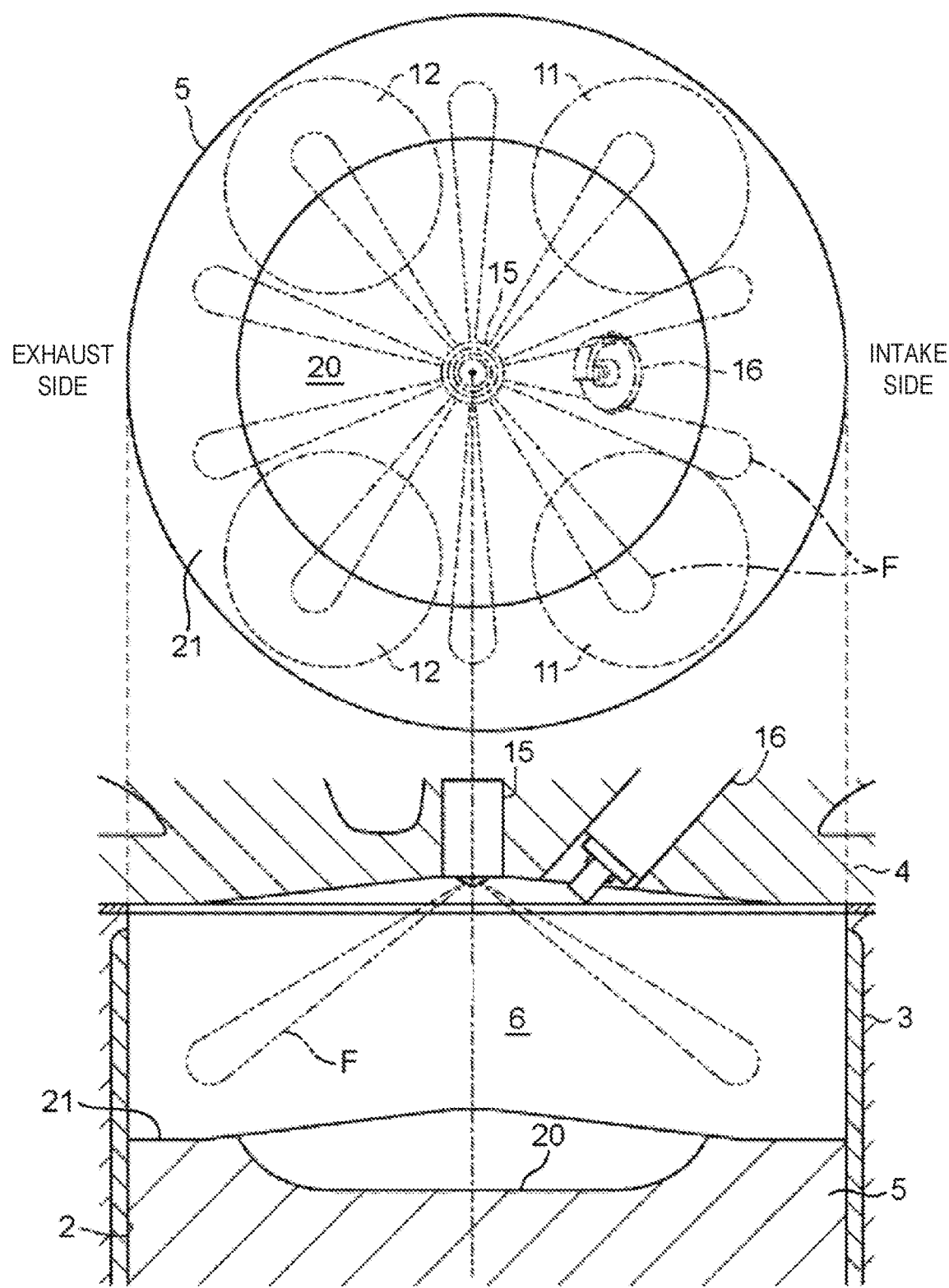
FIG. 2 is a view collectively illustrating a cross-sectional view of an engine body and a plan view of a piston.

FIGS. 1 and 2 are views illustrating a preferable embodiment of a compression ignition engine to which a control device of the present disclosure is applied (hereinafter, simply referred to as "the engine"). The engine illustrated in these figures is a four-cycle gasoline direct-injection engine mounted on the vehicle as a propelling source of the vehicle, and includes an engine body 1, an intake passage 30 where intake air introduced into the engine body 1 circulates, an exhaust passage 40 where exhaust gas discharged from the engine body 1 circulates, and an external exhaust gas recirculation (EGR) device 50 which recirculates a portion of exhaust gas which circulates through the exhaust passage 40 to the intake passage 30.

The engine body 1 has a cylinder block 3 where cylinders 2 are formed therein, a cylinder head 4 attached to an upper surface of the cylinder block 3 so as to cover up the cylinder 2 from above, and pistons 5 reciprocatably inserted in the respective cylinders 2. Although the engine body 1 is typically a multi-cylinder type having a plurality of cylinders (e.g., four), only one of the cylinders 2 is described herein for simplifying the description.

A combustion chamber 6 is defined above the piston 5, and fuel comprised of gasoline as its main component is supplied to the combustion chamber 6 by an injection from an injector 15 (described later). Then, the supplied fuel combusts inside the combustion chamber 6 while being mixed with air, and the expansive force produced by the combustion pushes the piston 5 to make the piston 5 reciprocate in the vertical direction.

Below the piston 5, a crankshaft 7 which is an output shaft of the engine body 1 is provided. The crankshaft 7 is connected with the piston 5 through a connecting rod 8, and is rotated on its center axis by the reciprocating motion (up-and-down motion) of the piston 5.

A geometric compression ratio of the cylinder 2, i.e., a ratio of a volume of the combustion chamber 6 when the piston 5 is at a top dead center to a volume of the combustion chamber 6 when the piston 5 is at a bottom dead center is set to a compression ratio, 14:1 or higher and 20:1 or lower, and preferably 16:1 or higher and 18:1 or lower, as a suitable value for SPCCI combustion (partial compression ignition combustion) described later.

The cylinder block 3 is provided with a crank angle sensor SN1 which detects a rotational angle of the crankshaft 7 (crank angle) and a rotating speed of the crankshaft 7 (engine speed), and a water temperature sensor SN2 which detects temperature of cooling water which circulates inside the cylinder block 3 and the cylinder head 4 (engine water temperature).

The cylinder head 4 is provided with an intake port 9 for introducing air supplied from the intake passage 30 into the combustion chamber 6, an exhaust port 10 for leading exhaust gas generated inside the combustion chamber 6 to the exhaust passage 40, an intake valve 11 which opens and closes an opening of the intake port 9 at the combustion chamber 6 side, and an exhaust valve 12 which opens and closes an opening of the exhaust port 10 at the combustion chamber 6 side. Note that as illustrated in FIG. 2, the valve type of the engine of this embodiment is a four-valve type having two intake valves and two exhaust valves. That is, in this embodiment, two intake ports 9 and two exhaust ports 10 are opened to the combustion chamber 6 of one cylinder 2, and corresponding to this, two intake valves 11 and two exhaust valves 12 are provided to one cylinder 2.

The intake valve 11 and the exhaust valve 12 are driven by a valve operating mechanism including a pair of cam shafts disposed in the cylinder head 4 to be opened and closed in an interlocked manner with the rotation of the crankshaft 7.

An intake VVT 13 which can change the opening-and-closing timings of the intake valve 11 is built in the valve operating mechanism for the intake valve 11. Similarly, an exhaust VVT 14 which can change the opening-and-closing timings of the exhaust valve 12 is built in the valve operating mechanism for the exhaust valve 12. The intake VVT 13 (exhaust VVT 14) is a so-called phase variable mechanism, and changes the open timing and the close timing of the intake valve 11 (exhaust valve 12) simultaneously by the same amount.

Figure 3:
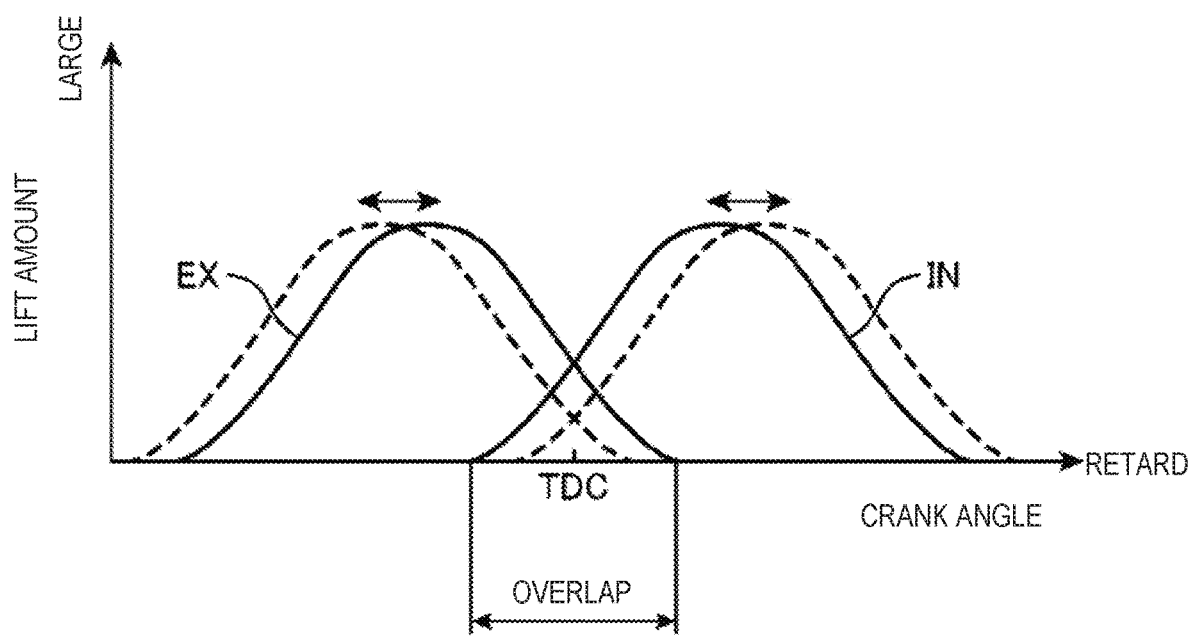
FIG. 3 is a view illustrating lift curves of an intake valve and an exhaust valve.

FIG. 3 is a view illustrating a lift curve of the intake valve 11 and the exhaust valve 12, where "IN" indicates the lift curve of the intake valve 11 and "EX" indicates the lift curve of the exhaust valve 12. As illustrated in this figure, the intake valve 11 and the exhaust valve 12 may be driven so that their valve opening periods overlap with each other, including an exhaust top dead center (TDC in FIG. 3). This overlap period, i.e., a period during which both the intake valve 11 and the exhaust valve 12 open is referred to as a "valve overlap period." The valve overlap period can be adjusted by controlling the intake VVT 13 and the exhaust VVT 14 described above. Waveforms of solid lines in FIG. 3 illustrate a case where the valve overlap period is comparatively lengthened, and in this case, by continuing the opening of the exhaust valve 12 until an early period of an intake stroke after the exhaust top dead center (TDC), burnt gas (exhaust gas) is pulled back from the exhaust port 10 to the combustion chamber 6 to achieve internal EGR. On the contrary, as illustrated by waveforms of dashed lines, when the valve overlap period is shortened, an amount of the burnt gas pulled back from the exhaust port 10 (remained) as described above decreases, and, as the result, the internal EGR is reduced or suspended.

As illustrated in FIGS. 1 and 2, the cylinder head 4 is provided with the injector 15 which injects fuel (gasoline) into the combustion chamber 6, and an ignition plug 16 which ignites a mixture gas in which the fuel injected into the combustion chamber 6 from the injector 15 is mixed with intake air.

As illustrated in FIG. 2, a cavity 20 is formed in a crown surface of the piston 5, where a comparatively large area including a central part of the piston 5 is dented to the opposite side from the cylinder head 4 (downwardly). Moreover, a squish part 21 which is comprised of an annular flat surface is formed in the crown surface of the piston 5, radially outward of the cavity 20.

The injector 15 is a multiple nozzle-hole injector having a plurality of nozzle holes at a tip end, and it is capable of injecting fuel radiately from the plurality of nozzle holes (F in FIG. 2 indicates a fuel spray of fuel injected from each nozzle hole). The injector 15 is disposed in a central part of a ceiling surface of the combustion chamber 6 so that the tip end thereof opposes to the central part of the crown surface of the piston 5 (the center of the bottom surface of the cavity 20).

The ignition plug 16 is disposed at a position somewhat offset to the intake side from the injector 15. The position of the tip-end part of the ignition plug 16 (electrode part) is set so as to overlap with the cavity 20 in a plan view.

As illustrated in FIG. 1, the intake passage 30 is connected to one side surface of the cylinder head 4 so as to communicate with the intake port 9. Air (fresh air) taken in from an upstream end of the intake passage 30 is introduced into the combustion chamber 6 through the intake passage 30 and the intake port 9.

The intake passage 30 is provided with, from the upstream side, an air cleaner 31 which removes foreign substances in the intake air, a throttle valve 32 which can open and close to adjust a flow rate of the intake air, a supercharger 33 which pumps the intake air while compressing the intake air, an intercooler 35 which cools the intake air which is compressed by the supercharger 33, and a surge tank 36. Note that the throttle valve 32 is one example of an "air amount adjusting mechanism" in the present disclosure. Note that in this embodiment, the introducing amount of air into the combustion chamber 6 varies also depending on the change of the valve timing of the intake and exhaust VVTs 13 and 14 described above, or open/close state of an EGR valve 53 described later. Thus, in this embodiment, the combination of the throttle valve 32, the intake and exhaust VVTs 13 and 14, and the EGR valve 53 is another example of the "air amount adjusting mechanism."

Respective parts of the intake passage 30 are provided with an airflow sensor SN3 which detects a flow rate of the intake air, an intake air temperature sensor SN4 which detects the temperature of the intake air, and an intake air pressure sensor SN5 which detects the pressure of the intake air. The airflow sensor SN3 and the intake air temperature sensor SN4 are provided to a part of the intake passage 30 between the air cleaner 31 and the throttle valve 32, and detect the flow rate and the temperature of the intake air which passes through this part, respectively. The intake air pressure sensor SN5 is provided to the surge tank 36 and detects the pressure of the intake air inside the surge tank 36.

The supercharger 33 is a mechanical supercharger which is mechanically coupled to the engine body 1. As the supercharger 33, it is not limited but any one of known superchargers, such as a Lysholm type, a root type, and a centrifugal type, can be used.

Between the supercharger 33 and the engine body 1, an electromagnetic clutch 34 which can electrically switch between its engagement state and disengagement state is provided. When the electromagnetic clutch 34 is engaged, a driving force is transmitted to the supercharger 33 from the engine body 1, and boosting by the supercharger 33 is then performed. On the other hand, when the electromagnetic clutch 34 is disengaged, the transmission of the driving force is intercepted, and the boosting by the supercharger 33 is suspended.

The intake passage 30 is provided with a bypass passage 38 for bypassing the supercharger 33. The bypass passage 38 connects the surge tank 36 with an EGR passage 51 (described later). The bypass passage 38 is provided with a bypass valve 39 which can be opened and closed.

The exhaust passage 40 is connected to the other side surface (opposite surface of the intake passage 30) of the cylinder head 4 so as to communicate with the exhaust port 10. The burnt gas generated inside the combustion chamber 6 is discharged outside through the exhaust port 10 and the exhaust passage 40.

The exhaust passage 40 is provided with a catalytic converter 41. A three-way catalyst 41a for purifying hazardous components (HC, CO, and $NO_x$) contained in exhaust gas circulating the exhaust passage 40, and a GPF (Gasoline Particulate Filter) 41b for collecting particulate matter (PM) contained in the exhaust gas are built in the catalytic converter 41.

An air-fuel ratio (A/F) sensor SN6 which detects an oxygen concentration in exhaust gas is provided to the exhaust passage 40 upstream of the catalytic converter 41.

The external EGR device 50 has the EGR passage 51 which connects the exhaust passage 40 with the intake passage 30, and an EGR cooler 52 and the EGR valve 53 provided to the EGR passage 51. The EGR passage 51 connects a part of the exhaust passage 40 downstream of the catalytic converter 41 with a part of the intake passage 30 between the throttle valve 32 and the supercharger 33. The EGR cooler 52 cools exhaust gas which recirculates from the exhaust passage 40 to the intake passage 30 through the EGR passage 51 (external EGR gas) by heat exchange. The EGR valve 53 is provided to the EGR passage 51 downstream of the EGR cooler 52 (closer to the intake passage 30) so as to be opened and closed, and adjusts a flow rate of exhaust gas which circulates the EGR passage 51.

(2) Control System

Figure 4:
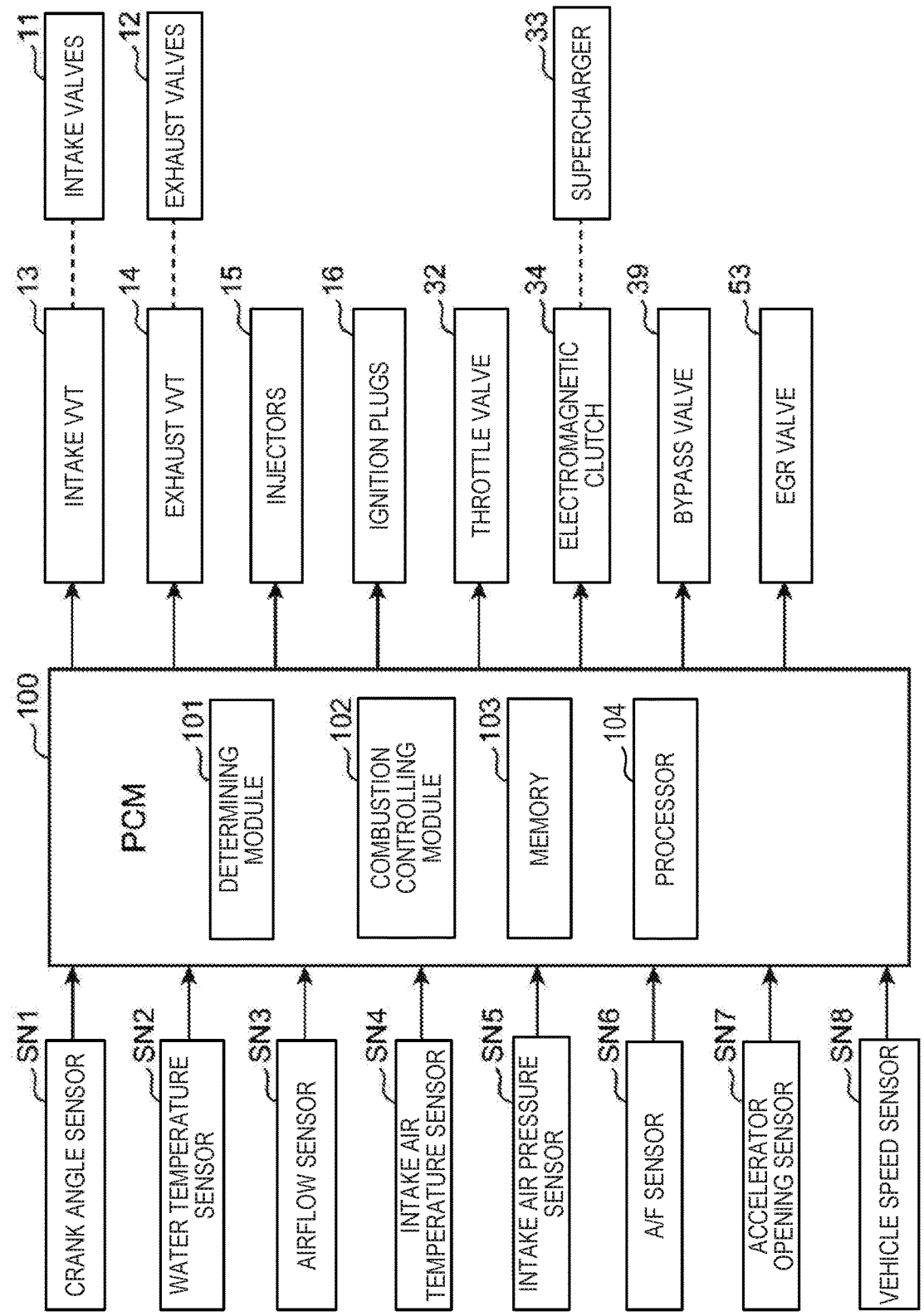
FIG. 4 is a block diagram illustrating a control system of the engine.

FIG. 4 is a block diagram illustrating a control system of the engine. A PCM (powertrain control module) 100 illustrated in this figure is a microcomputer for comprehensively controlling the engine, etc., and is comprised of a processor 104 (e.g., a central processing unit (CPU)) which executes software programs and memory 103 that includes ROM and RAM, etc. which are well known.

Detection signals of various sensors are inputted into the PCM 100. For example, the PCM 100 is electrically connected to the crank angle sensor SN1, the water temperature sensor SN2, the airflow sensor SN3, the intake air temperature sensor SN4, the intake air pressure sensor SN5, and the A/F sensor SN6 which are described above. Information detected by these sensors (i.e., a crank angle, an engine speed, an engine water temperature, an intake air flow rate, an intake air temperature, an intake pressure, and an oxygen concentration) are sequentially inputted into the PCM 100.

Moreover, the vehicle is provided with an accelerator opening sensor SN7 which detects an opening of an accelerator pedal (hereinafter, referred to as "the accelerator opening") operated by a driver who operates the vehicle, and a vehicle speed sensor SN8 which detects a traveling speed of the vehicle (hereinafter, referred to as "the vehicle speed"). Detection signals of these sensors SN7 and SN8 are also sequentially inputted into the PCM 100.

The PCM 100 controls each part of the engine, while performing various determinations, calculations, etc. based on the input information from the corresponding sensor(s). That is, the PCM 100 is electrically connected, for example, to the intake and exhaust VVTs 13 and 14, the injector 15, the ignition plug 16, the throttle valve 32, the electromagnetic clutch 34, the bypass valve 39, and the EGR valve 53, and based on the result(s) of the calculation(s), etc., it outputs a control signal to the corresponding device.

In detail, the PCM 100 further comprises a determining module 101 and a combustion controlling module 102 stored in the memory 103 as software modules. The processor 104 is configured to execute these modules to perform their respective functions.

The combustion controlling module 102 is a control module which controls combustion of the mixture gas inside the combustion chamber 6, and controls each part of the engine so that an output torque, etc. of the engine becomes a suitable value according to a demand of a driver. The determining module 101 is a control module which performs various determinations required for determining contents of the control executed by the combustion controlling module 102. The memory 103 stores various data required for processings in the determining module 101 and the combustion controlling module 102.

(3) Control According to Operating State

Figure 5:
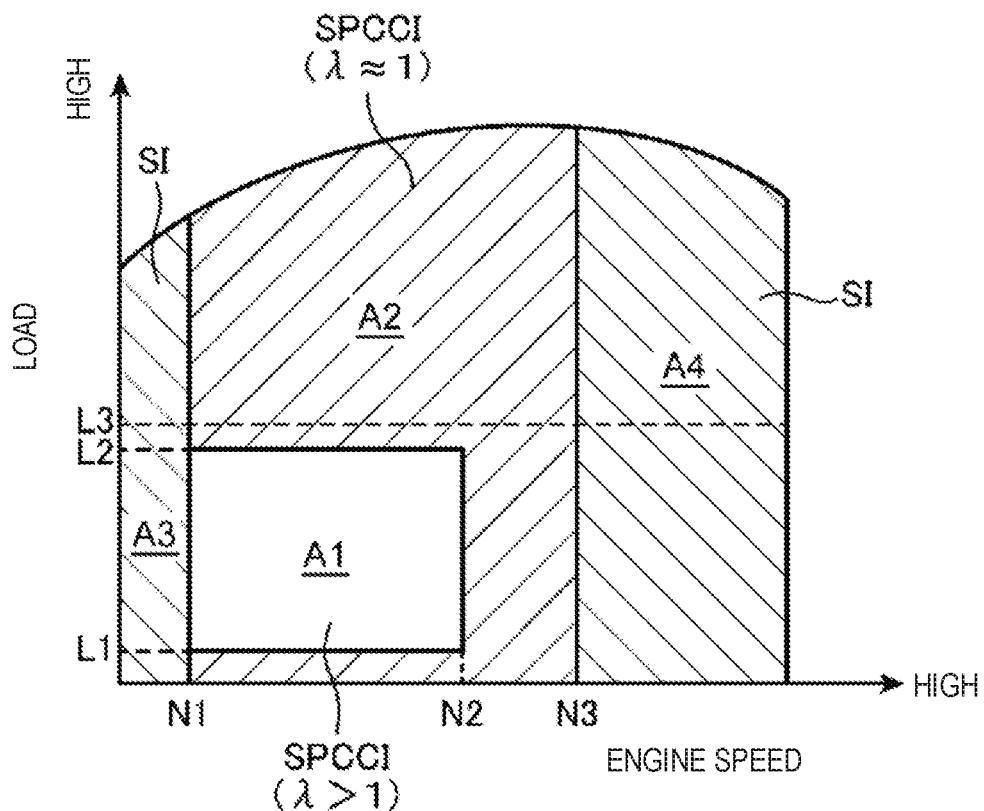
FIG. 5 is an operation map in which an operating range of the engine is classified by a difference in a combustion mode.

FIG. 5 is an operation map illustrating a difference of combustion control according to the engine speed and load. As illustrated in FIG. 5, the operating range of the engine is roughly divided into four operating ranges A1-A4 according to the difference in the combustion mode. Suppose the four operating ranges are a first operating range A1, a second operating range A2, a third operating range A3, and a fourth operating range A4, the third operating range A3 is an extremely low-speed range where the engine speed is less than a first speed N1, and the fourth operating range A4 is a high-speed range where the engine speed is greater than or equal to a third speed N3, and the first operating range A1 is a low-speed low-load range where the load is comparatively low, other than the third and fourth operating range A3 and A4 (low and middle-speed range), and the second operating range A2 is a remaining range other than the first, third, and fourth operating ranges A1, A3, and A4.

The first operating range A1 is an example of a "specific range" in the present disclosure. According to the example of FIG. 5, the first operating range A1 is a range of a substantially rectangular shape located inside the second operating range A2, and is surrounded by the first speed N1 which is a lower-limit speed of the second operating range A2, a second speed N2 less than an upper-limit speed (third speed N3) of the second operating range A2, a first load L1 greater than the minimum load of the engine, and a second load L2 greater than the first load L1. The second load L2 which is an upper-limit load of the first operating range A1 is set to a value slightly less than a third load L3 which is a lower-limit load at which the supercharger 33 can be driven. That is, the first operating range A1 is set so as not to overlap with the boosting area where the boost by the supercharger 33 is performed.

Below, an outline of a combustion control in the first to fourth operating ranges A1-A4 is described.

(3-1) First Operating Range

In the first operating range A1 with the low speed and the low load, partial compression ignition combustion in which SI combustion and CI combustion are combined is performed (hereinafter, referred to as SPCCI combustion). SI combustion is a combustion mode in which the mixture gas is ignited by sparks generated from the ignition plug 16, and the mixture gas is forcibly combusted by flame propagation which extends a combustion range from an ignited point to the perimeter. CI combustion is a combustion mode in which the mixture gas is combusted by a self-ignition under the environment where the mixture gas is brought to a sufficiently high temperature and high pressure by compression of the piston 5. The SPCCI combustion which is the combination of SI combustion and CI combustion is a combustion mode in which SI combustion of a portion of the mixture gas inside the combustion chamber 6 is performed by a jump-spark ignition performed under the environment where the mixture gas is about to self-ignite, and CI combustion of the remaining mixture gas inside the combustion chamber 6 is performed by a self-ignition after the SI combustion (i.e., by the further increase in the temperature and the pressure accompanying the SI combustion). Note that "SPCCI" is an abbreviation for "SPark Controlled Compression Ignition."

Figure 6:
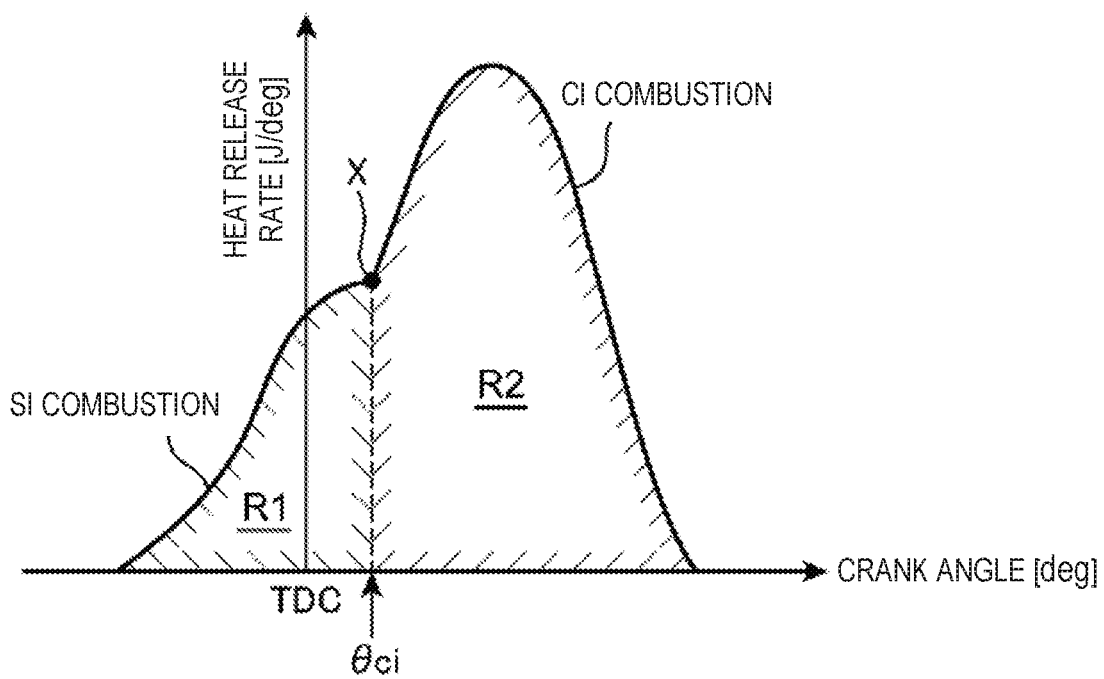
FIG. 6 is a graph illustrating a waveform of a rate of heat release during SPCCI combustion (partial compression ignition combustion).

FIG. 6 illustrates a graph illustrating a combustion waveform, i.e., a change in a rate of heat release (J/deg) by a crank angle, when the SPCCI combustion described above is carried out. As illustrated in this figure, in SPCCI combustion, heat release by SI combustion and a heat release by CI combustion are continuously generated in this order. At this time, due to the nature in which a combustion rate of CI combustion is quicker, a rise of the heat release of CI combustion is steeper than that of SI combustion. For this reason, the waveform of the rate of heat release in SPCCI combustion has a point of inflection X which appears at a timing of switching from SI combustion to CI combustion (θci, described later).

As a specific mode of such SPCCI combustion, in the first operating range A1, a control in which an A/F-lean mixture gas having an air-fuel ratio larger than a stoichiometric air-fuel ratio is formed inside the combustion chamber 6, and SPCCI combustion of the mixture gas is performed, in other words, a control in which SPCCI combustion of the mixture gas at $\lambda > 1$ ($\lambda$ is an excess air factor) is carried out, is performed. In order to achieve such A/F-lean SPCCI combustion, in the first operating range A1, each part of the engine is controlled by the PCM 100 as follows.

The opening of the throttle valve 32 is set to a comparatively large value so that an amount of air more than the amount of air corresponding to a stoichiometric air-fuel ratio is introduced into the combustion chamber 6 through the intake passage 30. That is, in the first operating range A1, a target value of the air-fuel ratio (A/F) which is a weight ratio of air (fresh air) introduced into the combustion chamber 6 through the intake passage 30 to fuel injected into the combustion chamber 6 from the injector 15 is set to a value sufficiently larger than the stoichiometric air-fuel ratio (14.7:1) (see FIG. 11 which will be described later). Then, the opening of the throttle valve 32 is determined each time so that the target value of the air-fuel ratio (target air-fuel ratio) is achieved, and the throttle valve 32 is controlled according to this determination.

The supercharger 33 is suspended. That is, since the first operating range A1 is located at a lower load side of the third load L3 which is the lower limit of the load range which requires boosting, the boost by the supercharger 33 is unnecessary. Therefore, in the first operating range A1, the electromagnetic clutch 34 is released to disconnect the supercharger 33 from the engine body 1, and the bypass valve 39 is fully opened, to suspend the boost by the supercharger 33.

Here, in SPCCI combustion which is the combination of SI combustion and CI combustion, it is important to control a ratio of SI combustion and CI combustion according to the operating condition. In this embodiment, focusing on a SI ratio which is a ratio of an amount of heat release by SI combustion to the total amount of heat release by SPCCI combustion (SI combustion and CI combustion), each part of the engine is controlled so that the SI ratio becomes an appropriate value.

The SI ratio is described with reference to FIG. 6. In FIG. 6, suppose that the crank-angle $\theta ci$ corresponding to the point of inflection X at which the combustion mode changes from SI combustion to CI combustion is a start timing of CI combustion. In this case, the amount of heat release by SI combustion corresponds to a waveform area R1 of the rate of heat release at the advancing side of $\theta ci$ (start timing of CI combustion), and the amount of heat release by CI combustion corresponds to a waveform area R2 of the rate of heat release at the retarded side of $\theta ci$. The SI ratio can be defined as $R1/(R1+R2)$ using the areas R1 and R2.

In the first operating range A1 where SPCCI combustion is performed, each part of the engine is controlled so that the SI ratio and $\theta ci$ which are described above match with target values defined beforehand. That is, in the first operating range A1, a target SI ratio which is a target value of the SI ratio and a target $\theta ci$ which is a target value of $\theta ci$ are defined, respectively, for each of various conditions with different engine loads and speeds. Then, a plurality of parameters, such as an injection amount and an injection timing of fuel from the injector 15, a timing of the jump-spark ignition by the ignition plug 16 (ignition timing), and an EGR rate (an external EGR rate and an internal EGR rate) are controlled so as to become a combination which can realize the target SI ratio and the target $\theta ci$. Note that the external EGR rate is a weight ratio of the external EGR gas (exhaust gas which recirculates to the combustion chamber 6 through the EGR passage 51) to the entire gas inside the combustion chamber 6. The internal EGR rate is a weight ratio of the internal EGR gas (burnt gas which remains inside the combustion chamber 6 by the internal EGR) to the entire gas inside the combustion chamber 6.

For example, the injection amount and the injection timing of fuel are determined by using a map defined beforehand in consideration of the target SI ratio and the target $\theta ci$. Moreover, for the external EGR rate and the internal EGR rate, the open and close timings of the intake and exhaust valves 11 and 12 (valve overlap period) which are the main influence factors of both the EGR rates, and the opening of the EGR valve 53 are determined by using a map which is also defined in consideration of the target SI ratio and the target $\theta ci$.

Figure 7:
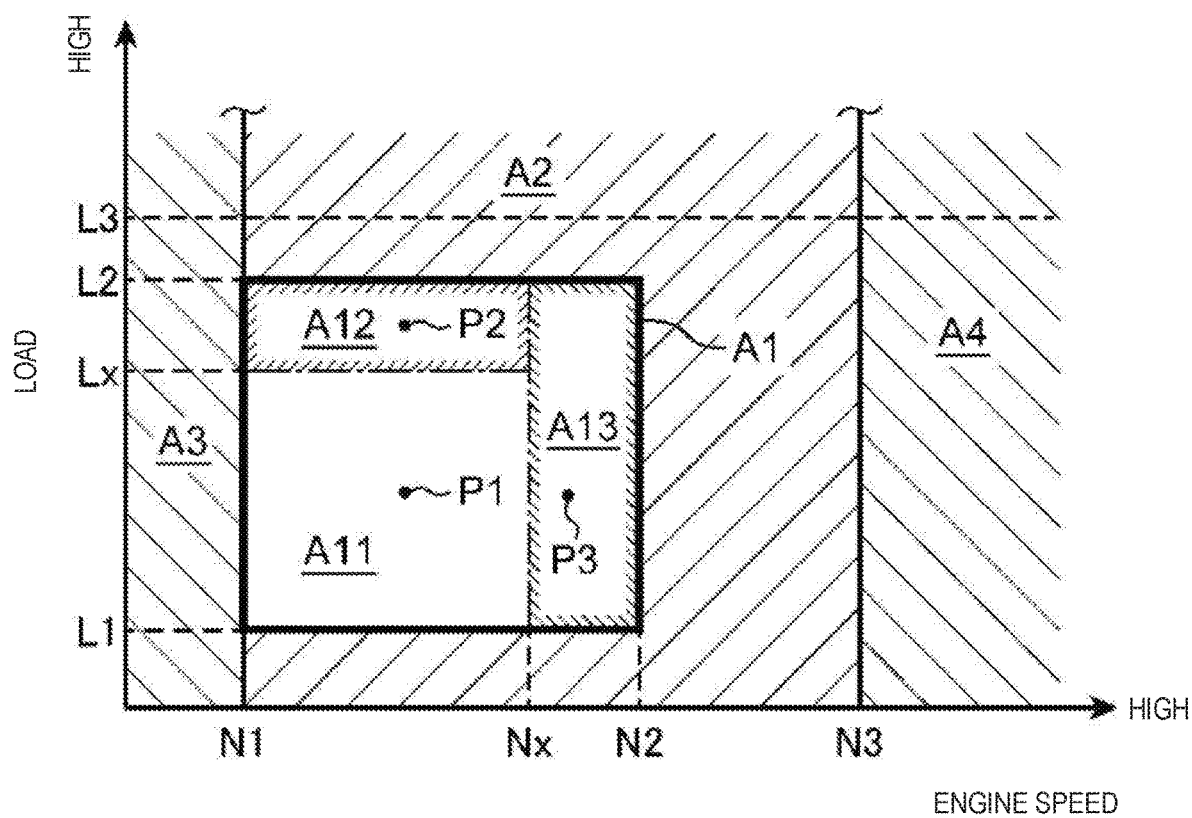
FIG. 7 is an enlarged operation map of a first operating range in the map of FIG. 5, where the first operating range is classified by a difference in the ignition control.

Here, in this embodiment, an injection pattern of fuel in the first operating range A1 is a pattern in which fuel is injected in a plurality of steps during an intake stroke. For example, the injection patterns at operation points P1, P2, and P3 in an enlarged operation map illustrated in FIG. 7 are set as patterns in which three fuel injections are performed during an intake stroke (see fuel injections F1, F2, and F3 illustrated in FIG. 8). The injection amount and the injection timing of fuel in the first operating range A1 are defined beforehand as values in consideration of the target SI ratio and the target $\theta ci$ described above on the assumption of adopting such a divided injection pattern, for each fuel injection.

On the other hand, the timing of the jump-spark ignition (ignition timing) by the ignition plug 16 is determined as a timing at which the target SI ratio and the target $\theta ci$ are obtained by a calculation using a given model formula.

Figure 8:
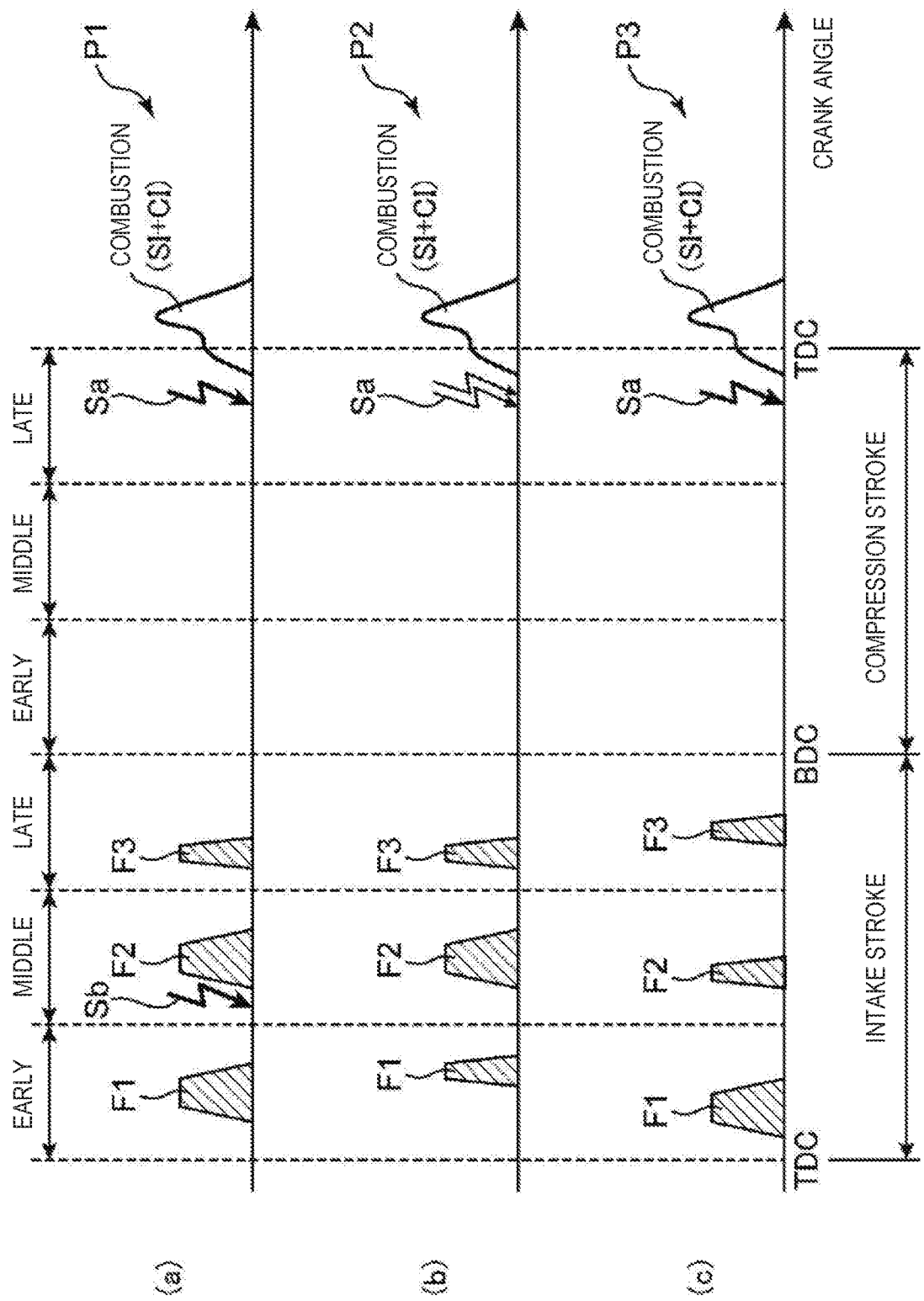
FIG. 8 is a time chart illustrating patterns of fuel injection and the jump-spark ignition performed in the first operating range, where Charts (a) to (c) illustrate patterns under conditions from which the engine speed and the load differ.

As illustrated in FIG. 8, in this embodiment, depending on the operating condition, in addition to a normal jump-spark ignition (hereinafter, referred to as a "normal ignition Sa") for carrying out a forcible ignition of the mixture gas, a jump-spark ignition (hereinafter, referred to as a "preceding ignition Sb") in which sparks are generated at a timing earlier than the normal ignition by a given amount or more may be performed. In detail, the jump-spark ignitions (the preceding ignition Sb and the normal ignition Sa) in such a special mode are performed in a first subdivided range A11 including the operation point P1 in FIG. 7. The first subdivided range A11 is a partial range of the first operating range A1 where the engine speed is equal to or less than a boundary speed Nx and the load is equal to or less than a boundary load Lx. On the other hand, other subdivided ranges excluding the first subdivided range A11, i.e., in a third subdivided range A13 on the high-speed side of the boundary speed Nx, and a second subdivided range A12 on the high-load side of the boundary load Lx, only the normal ignition Sa is performed and the preceding ignition Sb is not performed. Note that the first subdivided range A11 is an example of a "first range" in the present disclosure, and the second subdivided range A12 is an example of a "second range" in the present disclosure.

Although the details will be described later, in the first subdivided range A11 where the preceding ignition Sb and the normal ignition Sa are performed, the timing of the normal ignition Sa is determined using the model formula. On the other hand, the energy of the normal ignition Sa, and the timing and the energy of the preceding ignition Sb are fixed, regardless of the load and the engine speed. Moreover, in the second and third subdivided ranges A12 and A13 where only the normal ignition Sa is performed, the timing of the normal ignition Sa is determined using the model formula, and the energy of the normal ignition Sa is constant regardless of the load and the engine speed. Note that as illustrated in Chart (b) of FIG. 8, two adjacent arrows expressing the normal ignition Sa in the second subdivided range A12 illustrate that an intermittent ignition in which the electric discharge from the ignition plug 16 is temporarily suspended is performed as the normal ignition Sa, and this does not mean that the preceding ignition Sb is performed (the details will be described later).

As described above, in the first operating range A1, by the method in which the map defined beforehand and the calculation using the model formula are combined, the ignition timing, the injection amount and the injection timing of fuel, the open and close timings of the intake and exhaust valves 11 and 12, and the opening of the EGR valve 53 are controlled to become a combination so that the appropriate SI ratio and $\theta ci$ (the target SI ratio and the target $\theta ci$) which are defined beforehand for every operating condition are obtained.

(3-2) Second Operating Range

Also in the second operating range A2, which is a speed range equal to or greater than the first speed N1 and less than the third speed N3 (low and middle-speed range), excluding the first operating range A1, the control for combusting the mixture gas by SPCCI combustion is performed. Note that in the second operating range A2, unlike the first operating range A1, the air-fuel ratio (A/F) in the combustion chamber 6 is set near a stoichiometric air-fuel ratio, and the number of jump-spark ignitions by the ignition plug 16 is restricted to once per combustion cycle.

That is, in the second operating range A2, the opening of the throttle valve 32 is set to an opening at which the amount of air equivalent to a stoichiometric air-fuel ratio is introduced into the combustion chamber 6 through the intake passage 30, i.e., an opening at which the air-fuel ratio (A/F) which is the weight ratio of air (fresh air) to fuel inside the combustion chamber 6 substantially reaches a stoichiometric air-fuel ratio (14.7:1). In other words, in the second operating range A2, a control in which SPCCI combustion of the mixture gas is carried out under a stoichiometric environment where the air-fuel ratio inside the combustion chamber 6 becomes near the stoichiometric air-fuel ratio ($\lambda \approx 1$) is performed.

Moreover, the jump-spark ignition by the ignition plug 16 is performed near a compression top dead center at a frequency of once per combustion cycle. That is, in the second operating range A2, only the normal jump-spark ignition which forcibly ignites the mixture gas is performed near a compression top dead center, and the ignition equivalent to the preceding ignition described above is not performed.

Here, also in the second operating range A2, the target SI ratio and the target θci are defined for every condition of the engine speed and load, similar to the first operating range A1 described above. The injection amount and the injection timing of fuel, the open and close timings of the intake and exhaust valves 11 and 12, and the opening of the EGR valve 53 are determined using the map defined beforehand so that they become values suitable for achieving the target SI ratio and the target θci. Moreover, for the ignition timing by the ignition plug 16, the ignition timing which can achieve the target SI ratio and the target θci is determined by the calculation using the given model formula.

The supercharger 33 is driven or suspended according to whether the engine load is higher or lower than the third load L3. That is, the supercharger 33 is driven in a partial range of the second operating range A2 at the high load side where the engine load becomes the third load L3 or higher, and is suspended in a partial area of the second operating range A2 at the low load side where the engine load becomes lower than the third load L3. In the range at the high load side where the supercharger 33 is driven, the boost by the supercharger 33 is performed by connecting the electromagnetic clutch 34 to connect the supercharger 33 with the engine body 1. At this time, the opening of the bypass valve 39 is controlled so that the pressure inside the surge tank 36 (boosting pressure) detected by the intake air pressure sensor SN5 reaches a target pressure defined beforehand for every condition of the engine speed and load.

(3-3) Third Operating Range and Fourth Operating Range

In the third operating range A3 (very low-speed range) where the engine speed is less than the first speed N1, and the fourth operating range A4 (high-speed range) where the engine speed is greater than or equal to the third speed N3, a control for combusting the mixture gas by SI combustion is performed. For example, while the entire amount of fuel to be injected in one combustion cycle is injected during an intake stroke from the injector 15, the jump-spark ignition by the ignition plug 16 is performed near a compression top dead center. Then, SI combustion is started triggered by this jump-spark ignition, and all the mixture gas inside the combustion chamber 6 combusts by flame propagation.

(4) Injection and Ignition Control in First Operating Range

Figure 9:
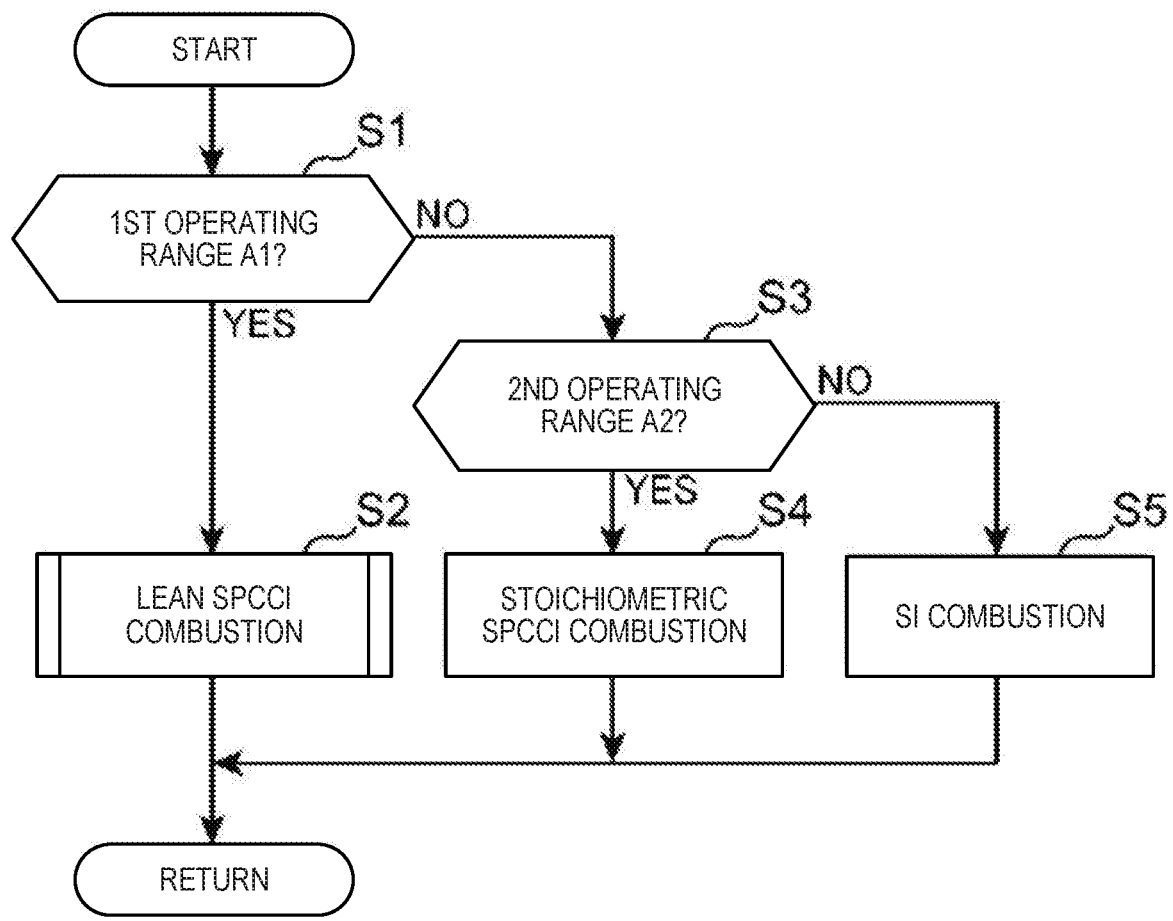
FIG. 9 is a flowchart illustrating a control operation executed during operation of the engine.
Figure 10:
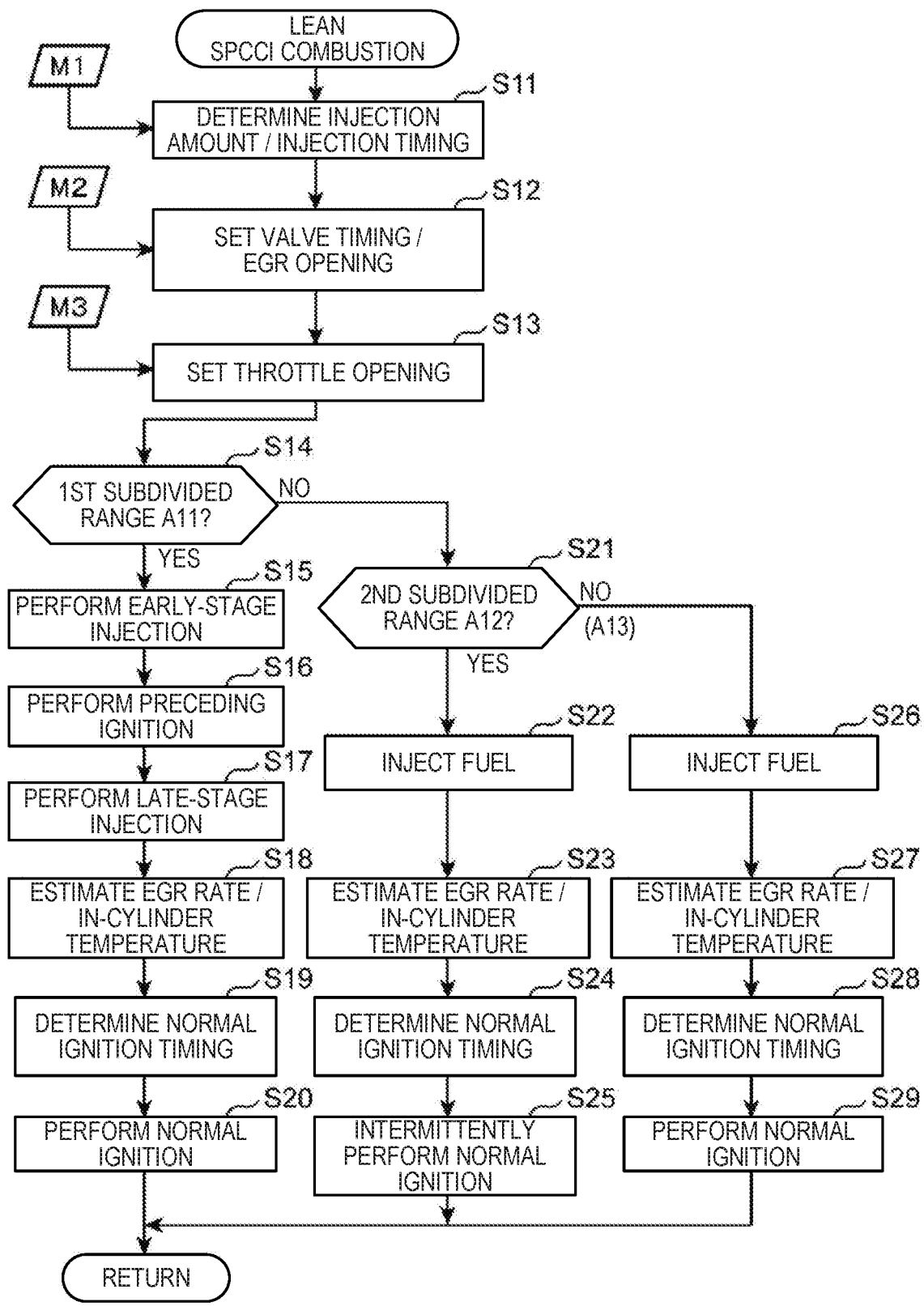
FIG. 10 is a subroutine illustrating a specific procedure at Step S2 in FIG. 9.

Next, a more specific example of the control in the first operating range A1, especially, an example of the control of the fuel injection and the jump-spark ignition is described with reference to FIGS. 9 and 10. Note that as a premise to which the flowcharts of FIGS. 9 and 10 are applied, suppose the engine is in a semi-warm state, or a warm state. The engine being in the semi-warm state or the warm state is determined based on the engine water temperature detected by the water temperature sensor SN2. For example, if the detected engine water temperature is greater than or equal to 70° C., it is determined that the engine is in the semi-warm state or the warm state, and the flowcharts of FIGS. 9 and 10 are applied.

When the control illustrated in FIG. 9 starts, the determining module 101 of a PCM 100 determines at Step S1 whether the current operation point of the engine is included in the first operating range A1 illustrated in FIG. 5. That is, based on the engine speed detected by the crank angle sensor SN1, and the engine load (required torque) identified from the detection value of the accelerator opening sensor SN7 (accelerator opening), the detection value of the vehicle speed sensor SN8 (vehicle speed), etc., the determining module 101 identifies the current operation point of the engine on the operation map in FIG. 5, and determines whether the current operation point is included in the first operating range A1 in this map.

If it is determined as YES at Step S1 and it is confirmed that the current operation point of the engine is included in the first operating range A1, the combustion controlling module 102 of the PCM 100 shifts to Step S2, where it adjusts the air-fuel ratio inside the combustion chamber 6 to a value larger than a stoichiometric air-fuel ratio ($\lambda > 1$), and executes a control in which SPCCI combustion of the mixture gas is carried out (lean SPCCI combustion).

On the other hand, if it is determined as NO at Step S1 and it is confirmed that the current operation point of the engine is not included in the first operating range A1, the determining module 101 shifts to Step S3, where it determines whether the current operation point is included in the second operating range A2.

If it is determined as YES at Step S3 and it is confirmed that the current operation point of the engine is included in the second operating range A2, the combustion controlling module 102 shifts to Step S4, where it adjusts the air-fuel ratio inside the combustion chamber 6 to near the stoichiometric air-fuel ratio ($\lambda \approx 1$), and executes a control in which SPCCI combustion of the mixture gas is performed (stoichiometric SPCCI combustion).

On the other hand, if it is determined as NO at Step S3, that is, if it is confirmed that the current operation point of the engine is included in the third operating range A3 or the fourth operating range A4 illustrated in FIG. 5, the combustion controlling module 102 shifts to Step S5, where it executes a control in which the mixture gas is combusted not by SPCCI combustion but by SI combustion.

FIG. 10 is a subroutine illustrating a specific procedure of the control illustrated at Step S2 (i.e., the lean SPCCI combustion performed in the first operating range A1). When the control of the subroutine starts, the combustion controlling module 102 determines, at Step S11, the injection amount and the injection timing of fuel to be injected from the injector 15 based on the engine load and the engine speed which are identified from the sensors (the crank angle sensor SN1, the accelerator opening sensor SN7, etc.) described above. A map M1 is referenced for the determination of the injection amount and the injection timing. The map M1 defines the injection amount and the injection timing of fuel of the injector 15 for every condition of the engine load and the engine speed, and is stored beforehand in the memory 103.

As already described, in the first operating range A1, fuel is injected in a plurality of steps during an intake stroke. In detail, in the first operating range A1, as illustrated in FIG. 8, three fuel injections F1, F2, and F3 are performed during the intake stroke. The map M1 defines the injection amount and the injection timing of the injections F1-F3 for each time in such a divided injection pattern for every condition of the engine load and the engine speed, and each injection amount and injection timing are set in consideration of the target SI ratio and the target θci described in (3-1). In other words, at Step S11, the injection amount and the injection timing of each of the injections F1-F3 of the divided injection pattern adopted in the first operating range A1 are determined so as to become values suitable for achieving the target SI ratio and the target θci.

Next, the combustion controlling module 102 shifts to Step S12, where it determines the open and close timings (valve timings) of the intake and exhaust valves 11 and 12, and the opening of the EGR valve 53 (EGR opening) based on the engine load and the engine speed. And then, the combustion controlling module 102 controls the intake and exhaust VVTs 13 and 14, and the EGR valve 53 using the valve timing and the EGR opening which are determined, as target values. A map M2 is referenced for the determination of the valve timing and the EGR opening. The map M2 defines the valve timing and the EGR opening for every condition of the engine load and the engine speed, and is stored beforehand in the memory 103. By referring to such a map M2, the valve timing and the EGR opening are set as values suitable for achieving the target SI ratio and the target θci.

Figure 11:
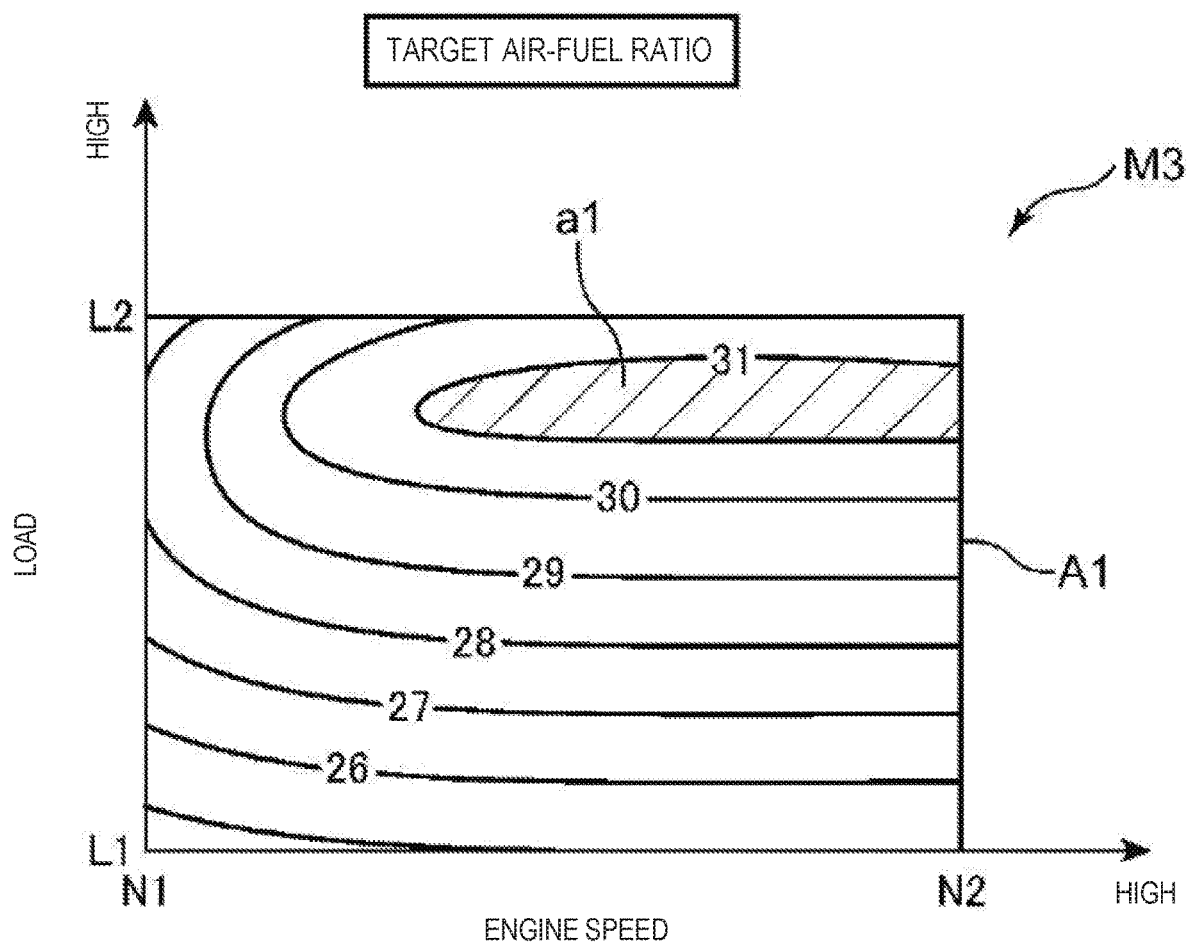
FIG. 11 is a map diagram illustrating one example of a target air-fuel ratio set in the first operating range.

Next, the combustion controlling module 102 shifts to Step S13, where it determines the opening of the throttle valve 32 (throttle opening) based on information, such as the engine load, the engine speed, etc., and controls the throttle valve 32 according to the determination. A map M3 of the target air-fuel ratio illustrated in FIG. 11 is referenced for the determination of the throttle opening. The map M3 defines the target air-fuel ratio at each operation point in the first operating range A1, and the value is variably set within a range higher than 20:1 and less than 35:1.

In detail, the target air-fuel ratio in the first operating range A1 defined on the map M3 (FIG. 11) is set, in general, so as to be higher as the load (required torque) increases in the first operating range A1. In more detail, the target air-fuel ratio is set so that it becomes the highest value (31:1 or higher) in a range a1 set near the second load L2 which is the upper-limit load of the first operating range A1, and becomes a value which decreases as it separates from the range a1. Note that the air-fuel ratio will never be 20:1 or lower at any position in the first operating range A1. Note that in this embodiment, the range a1 where the target air-fuel ratio becomes a maximum value is set as a belt-shaped range which is separated from the upper-limit load of the first operating range A1 (the second load L2) slightly to the low-load side, and is separated from the lower-limit speed of the first operating range A1 (the first speed N1) to the high speed side, i.e., as a middle/high-speed high-load range in the first operating range A1. Since the range a1 is close to the upper-limit load (the second load L2), a furthest range from the range a1 in the first operating range A1 is a range near idle where both the engine speed and the load become the minimum value, and therefore, the target air-fuel ratio becomes a minimum value in the range near idle.

At Step S13, the combustion controlling module 102 identifies the target air-fuel ratio which suits the current operation point (the load and the engine speed) from the map M3 (FIG. 11). Then, based on the identified target air-fuel ratio and the oxygen concentration in exhaust gas detected by the A/F sensor SN6, the opening of the throttle valve 32 is determined so that the air-fuel ratio inside the combustion chamber 6 reaches the target air-fuel ratio, and the throttle valve 32 is controlled according to this determination.

Next, the determining module 101 determines at Step S14 whether the current operation point of the engine is included in the first subdivided range A11 illustrated in FIG. 7, i.e., a partial range of the first operating range A1 where the engine speed is equal to or less than the boundary speed Nx and the load is equal to or less than the boundary load Lx, based on the detection values of the sensors (the crank angle sensor SN1, the accelerator opening sensor SN7, etc.).

If it is determined as YES at Step S14 and it is confirmed that the current operation point is included in the first subdivided range A11, the combustion controlling module 102 shifts to Step S15, where it causes the injector 15 to perform an early-stage injection. The early-stage injection is a first fuel injection F1 illustrated in Chart (a) of FIG. 8, i.e., a fuel injection performed before the preceding ignition Sb. The early-stage injection F1 is performed according to the injection amount and the injection timing of fuel determined at Step S11. That is, the combustion controlling module 102 controls the injector 15 so that an amount of fuel equivalent to the determined injection amount of the early-stage injection F1 is injected at the injection timing of the early-stage injection F1 determined at Step S11. As illustrated in Chart (a) of FIG. 8, the early-stage injection F1 in the first subdivided range A11 is performed so that the injection is started in an early period of an intake stroke.

Herein, periods, when an arbitrary stroke, such as an intake stroke and a compression stroke, is equally divided into three, are defined as the "early period," "middle period," and "late period" in this order in time sequence. Therefore, for example, (i) the early period, (ii) the middle period, and (iii) the late period of an intake stroke refer to ranges of (i) 360° CA to 300° CA before a compression top dead center (BTDC), (ii) 300° CA to 240° CA BTDC, and (iii) 240° CA to 180° CA BTDC, respectively.

Figure 12A:
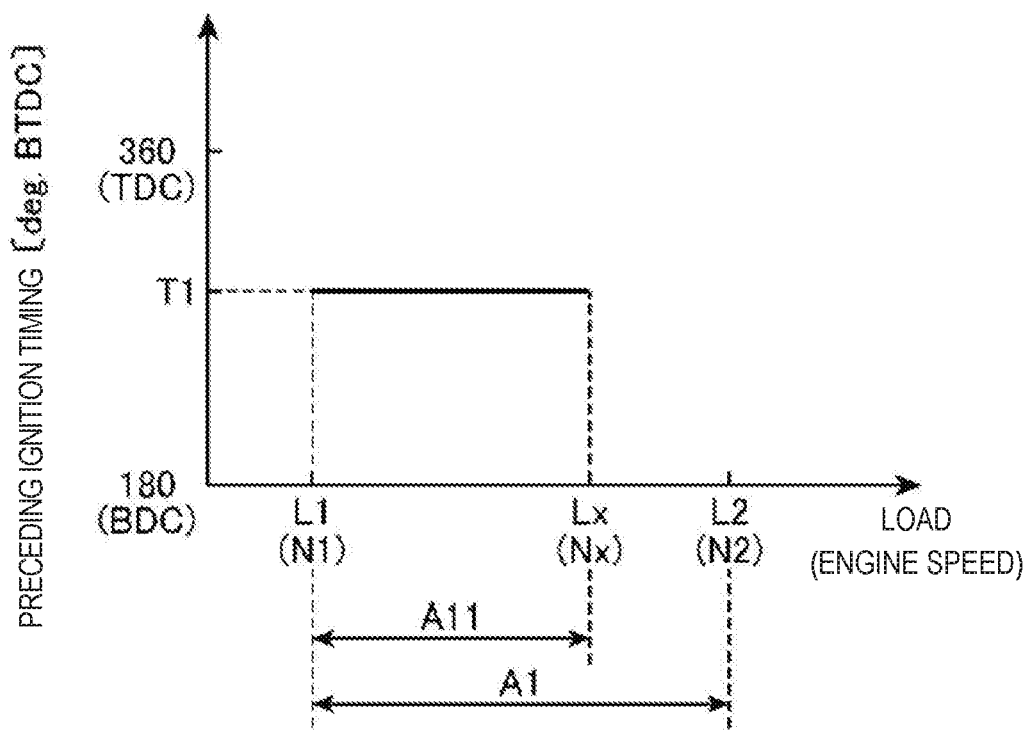
FIGS. 12A and 12B are graphs illustrating one example of settings of a timing and energy of the preceding ignition in the first operating range, where
Figure 12B:
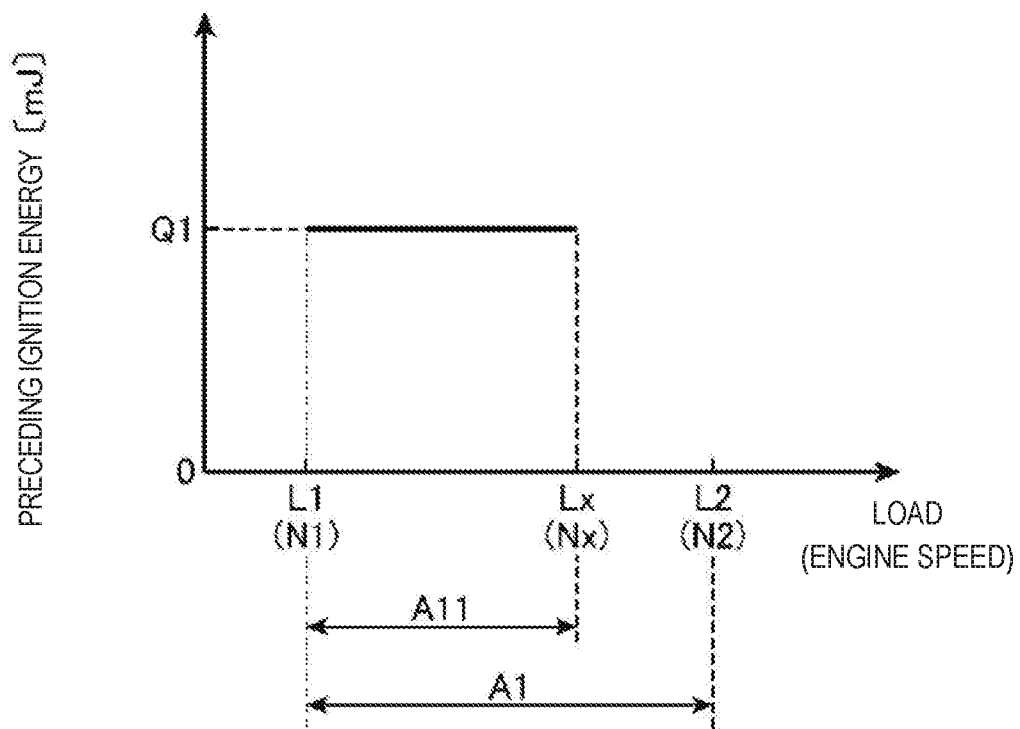

Next, the combustion controlling module 102 shifts to Step S16, where it causes the ignition plug 16 to perform the preceding ignition Sb. The timing and energy of the preceding ignition Sb are defined beforehand, and in this embodiment, as illustrated in FIGS. 12A and 12B, the timing and energy of the preceding ignition Sb are set so as to become constant at any operation point in the first subdivided range A11. That is, in the first subdivided range A11, regardless of the engine load and the engine speed, the timing of the preceding ignition Sb is set at the same timing T1, and the energy of the preceding ignition is set as the same value Q1. The ignition timing T1 of the preceding ignition Sb is a fixed timing included in the middle period of an intake stroke, and, for example, is set as 280° CA to 250°

CA before a compression top dead center (BTDC). Moreover, the energy Q1 of the preceding ignition Sb is the maximum energy which can be supplied by one continuous electric discharge from the ignition plug 16, in other words, is an electric discharge energy which can be obtained, in a state where the electric potential of the capacitor included in ignition circuitry of the ignition plug 16 is raised to a maximum voltage, by supplying the energy accumulated in the capacitor by a single continuous discharge, and, for example, is set to 100 mJ.

As the control of the preceding ignition Sb at Step S16, the combustion controlling module 102 controls the ignition plug 16 at the ignition timing T1 set beforehand as described above so that sparks (arc) with the electric discharge energy Q1 defined beforehand are discharged from the ignition plug 16.

Here, the purpose of the preceding ignition Sb is not to cause the mixture gas to be forcibly ignited (produce flame propagation), but to carry out a fuel property modification to improve thermal efficiency. The preceding ignition Sb having the sufficiently high energy as described above is performed during an intake stroke (this embodiment middle period of an intake stroke) to achieve such a purpose to the maximum extent. That is, since the temperature inside the combustion chamber 6 is sufficiently low during an intake stroke, the flame propagation of the mixture gas does not substantially occur, even if the sparks (arc) having the maximum electric discharge energy Q1 is caused inside the combustion chamber 6 as the preceding ignition Sb. However, since the sparks itself are very high in the temperature, the temperature of the mixture gas around the sparks increases greatly. Thus, a layer of the mixture gas having the temperature of greater than or equal to 850 K and less than 1140 K (hereinafter, referred to as the "high-temperature layer") is formed, and, as a result, the fuel component (hydrocarbon) contained in the high-temperature layer cleaves to generate the intermediate product, such as OH radicals. In addition, since in this embodiment the electric discharge energy Q1 of the preceding ignition Sb is set as the maximum value (e.g., 100 mJ), the maximum thickness of the high-temperature layers is secured (an amount of the mixture gas at the temperature greater than or equal to 850 K and less than 1140 K), and, as a result, the intermediate product, such as OH radicals, is fully generated. Since OH radicals are strong in oxidation and highly reactive, it brings the action to speed up the progress of combustion, and therefore, thermal efficiency of CI combustion is improved.

After the preceding ignition Sb is performed, the combustion controlling module 102 shifts to Step S17, where it causes the injector 15 to perform a later-stage injection. The late-stage injection is the second and third fuel injections F2 and F3 illustrated in Chart (a) of FIG. 8, i.e., fuel injections performed later than the preceding ignition Sb. Suppose the fuel injection F2 is a first late-stage injection and the fuel injection F3 is a second late-stage injection, the first and second late-stage injections F2 and F3 are performed according to the injection amount and the injection timing of fuel determined at Step S11. That is, the combustion controlling module 102 controls the injector 15 at the injection timing of the first late-stage injection F2 (the second late-stage injection F3) determined at Step S11 so that an amount of fuel equivalent to the determined injection amount of the first late-stage injection F2 (the second late-stage injection F3) is injected. As illustrated in Chart (a) of FIG. 8, the first late-stage injection F2 is performed so that it starts in the middle period of an intake stroke, and the second late-stage injection F3 is performed so that it starts in the later period of the intake stroke.

Next, the combustion controlling module 102 shifts to Step S18, where it estimates an actual EGR rate inside the combustion chamber 6 and a temperature inside the combustion chamber 6 (in-cylinder temperature) near a compression top dead center (at or near the compression top dead center). As described above, in this embodiment, although the open and close timings of the intake and exhaust valves 11 and 12 (valve timings) and the opening of the EGR valve 53 (EGR valve opening) are defined on the maps, the EGR rate may vary with respect to the target value due to various factors, such as a response delay, even if the valve timings and the EGR valve opening are controlled as the settings of the maps. Moreover, the variation in the EGR rate leads a variation in the in-cylinder temperature near a compression top dead center, together with other factors, such as the ambient temperature. Therefore, the combustion controlling module 102 estimates the actual EGR rate inside the combustion chamber 6 (external EGR rate and internal EGR rate) at a close timing of the intake valve 11 (IVC timing), and the in-cylinder temperature near a compression top dead center immediately after the IVC based on the detection values from the various sensors, such as the airflow sensor SN3, the intake air temperature sensor SN4, and the intake air pressure sensor SN5 (intake air flow rate, intake air temperature, intake pressure, etc.), the settings of the valve timings and the EGR valve opening, and the given model formula determined beforehand. The model formula is a model formula in which, for example, the latest histories of parameters, such as the intake air flow rate, the intake air temperature, the intake pressure, the valve timings, and the EGR valve opening, are used as input elements, and is set so as to estimate the actual external EGR rate and the actual internal EGR rate at the IVC timing which reflect the response delay, and the in-cylinder temperature near the compression top dead center.

Next, the combustion controlling module 102 shifts to Step S19, where it determines the timing of the normal ignition Sa based on the EGR rate and the in-cylinder temperature estimated at Step S18. In detail, the combustion controlling module 102 determines, by using the model formula defined beforehand, the timing of the normal ignition Sa so that the target SI ratio and the target θci described above are achieved. The model formula is a model formula which uses a plurality of parameters including the estimated EGR rate (the external EGR rate and the internal EGR rate) and the in-cylinder temperature as the input elements, and it is set to calculate the timing of the normal ignition Sa so that the SI ratio and θci when the SPCCI combustion of the mixture gas is carried out matches with the target SI ratio and the target θci as much as possible.

In more detail, at Step S19, the combustion controlling module 102 first reads a reference ignition timing defined beforehand for every condition of the engine load and the engine speed from the memory 103. This reference ignition timing is a timing of the normal ignition Sa so that the target SI ratio and the target θci are achieved when the combustion chamber 6 is in the ideal condition, and is variably set according to the load and the engine speed within a given crank angle range near a compression top dead center. Next, the combustion controlling module 102 calculates a correcting amount of the ignition timing using the model formula based on the EGR rate and the in-cylinder temperature estimated at Step S18. Then, a timing obtained by advancing or retarding the reference ignition timing by the calculated correcting amount is determined as the timing of the normal ignition Sa. Thus, the timing of the normal ignition Sa thus determined is retarded from the reference ignition timing as the condition determined by the combination of the estimated EGR rate and in-cylinder temperature becomes easier to ignite the mixture gas, and conversely, is advanced from the reference ignition timing as the condition becomes more difficult to ignite the mixture gas. However, the timing of the normal ignition Sa will never deviate from the period at least from the later period of a compression stroke to the early period of an expansion stroke, i.e., the period of 60° CA before a compression top dead center (BTDC) to 60° CA after the compression top dead center (ATDC). In more detail, the timing of the normal ignition Sa is set to be included in the range from 30° CA BTDC to 10° CA ATDC at any point in the first subdivided range A11. This is similar to other subdivided ranges in the first operating range A1 (the second and third subdivided ranges A12 and A13).

Next, the combustion controlling module 102 shifts to Step S20, where it causes the ignition plug 16 to perform the normal ignition Sa. That is, the combustion controlling module 102 controls the ignition plug 16 so that sparks are discharged from the ignition plug 16 at the ignition timing determined at Step S19. The electric discharge energy supplied by the normal ignition Sa is set identically to the electric discharge energy of the preceding ignition Sb. In other words, in the normal ignition Sa, the sparks having the maximum energy which can be supplied by a single continuous discharge (equivalent to the electric discharge energy Q1 in FIG. 12B) are discharged from the ignition plug 16, similar to the preceding ignition Sb.

Next, a control, if it is determined as NO at Step S14, that is, if the current operation point of the engine is not included in the first subdivided range A11, is described. In this case, the determining module 101 shifts to Step S21, where it determines whether the current operation point of the engine illustrated in FIG. 7 is included in the second subdivided range A12, i.e., in a partial range of the first operating range A1 where the engine speed is less than or equal to the boundary speed Nx and the load is higher than the boundary load Lx.

If it is determined as YES at Step S21 and it is confirmed that the current operation point is included in the second subdivided range A12, the combustion controlling module 102 shifts to Step S22, where it causes the injector 15 to inject fuel. Here, in the second subdivided range A12, as illustrated in Chart (b) of FIG. 8, the fuel injections F1, F2, and F3 are performed in 3 steps during an intake stroke. Moreover, the injection amount and the injection timing of each time in the second subdivided range A12 are already determined at Step S11 described above. At Step S22, the combustion controlling module 102 controls the injector 15 so that the amounts of fuel equivalent to the determined injection amounts of the respective fuel injections F1-F3 are injected sequentially at the injection timings of the respective fuel injections F1-F3 determined at Step S11 described above.

Next, the combustion controlling module 102 shifts to Step S23, where it estimates the EGR rate inside the combustion chamber 6, and the temperature inside the combustion chamber 6 near a compression top dead center (in-cylinder temperature). That is, the combustion controlling module 102 estimates the EGR rate and the in-cylinder temperature at the IVC timing by using the given model formula which uses the histories of the various sensor values etc. as the input components, similar to Step S18 described above.

Next, the combustion controlling module 102 shifts to Step S24, where it determines the timing of the normal ignition Sa based on the EGR rate and the in-cylinder temperature estimated at Step S23. That is, similarly to Step S19 described above, the combustion controlling module 102 uses the given model formula which uses the estimated values etc. of the EGR rate and the in-cylinder temperature as the input components to determine the timing of the normal ignition Sa so as to match the SI ratio and θci with the target values as much as possible.

Next, the combustion controlling module 102 shifts to Step S25, where it causes the ignition plug 16 to intermittently perform the normal ignition Sa. That is, the combustion controlling module 102 causes the ignition plug 16 to start the discharge of sparks (electric discharge) at the ignition timing determined at Step S24, suspends the electric discharge for a very short period time, and then again starts the electric discharge. Thus, at Step S25, the ignition plug 16 is controlled so that the intermittent ignition is performed as the normal ignition Sa in which the discharges of the sparks from the ignition plug 16 continue intermittently with the suspension for a short period of time therebetween. Note that here, although the energy supplied by the normal ignition Sa (intermittent ignition) becomes a value close to the maximum energy (equivalent to the electric discharge energy Q1 in FIG. 12B) which can be supplied by a single continuous discharge, it becomes a slightly larger value than Q1 because there is the suspension (discontinuation) between the electric discharges.

Next, a control, if it is determined as NO at Step S21, that is, the current operation point of the engine does not fall within any of the first and second subdivided ranges A11 and A12, and is included in the third subdivided range A13 (a range where the engine speed exceeds the boundary speed Nx of the first operating range A1), is described. In this case, the combustion controlling module 102 shifts to Step S26, where it causes the injector 15 to inject fuel. Here, in the third subdivided range A13, as illustrated in Chart (c) of FIG. 8, the fuel injections F1, F2, and F3 are performed in 3 steps during an intake stroke. Moreover, the injection amount and the injection timing of each time in the third subdivided range A13 are already determined at Step S11 described above. At Step S26, the combustion controlling module 102 controls the injector 15 so that amounts of fuel equivalent to the injection amounts of the respective fuel injections F1-F3 determined are injected sequentially at the injection timings of the respective fuel injections F1-F3 determined at Step S11 described above.

Next, the combustion controlling module 102 shifts to Step S27, where it estimates the EGR rate inside the combustion chamber 6, and the temperature inside the combustion chamber 6 (in-cylinder temperature) near a compression top dead center. That is, the combustion controlling module 102 estimates the EGR rate and the in-cylinder temperature at the IVC timing by using the given model formula which uses the histories of the various sensor values etc. as the input components, similar to Steps S18 and S23 described above.

Next, the combustion controlling module 102 shifts to Step S28, where it determines the timing of the normal ignition Sa based on the EGR rate and the in-cylinder temperature estimated at Step S27. That is, similar to Steps S19 and S24 described above, the combustion controlling module 102 uses the given model formula which uses the estimated values, etc. of the EGR rate and the in-cylinder temperature as the input components, and determines the timing of the normal ignition Sa so that the SI ratio and θci match with the target values as much as possible.

Next, the combustion controlling module 102 shifts to Step S29, where it causes the ignition plug 16 to perform the normal ignition Sa. Here, the normal ignition Sa is a typical jump-spark ignition in which sparks of the maximum energy (equivalent to the electric discharge energy Q1 in FIG. 12B) is discharged by a single continuous discharge.

(5) Specific Operation of Preceding Ignition and Normal Ignition

As described above, in this embodiment, two jump-spark ignitions comprised of the preceding ignition Sb and the normal ignition Sa are performed in one combustion cycle while operating in the first subdivided range A11 which is a main range of the first operating range A1 excluding the parts where the engine speed or the load is high (A12, A13). In order to perform such two jump-spark ignitions, the ignition plug 16 is controlled as follows, for example.

In this embodiment, one ignition plug 16 is provided to each cylinder 2, and the one ignition plug 16 is provided with one ignition circuitry comprised of an LC circuit including a coil and a capacitor. For this reason, in order to cause the ignition plug 16 to perform the two jump-spark ignitions, it is necessary to repeat the charge and discharge of the capacitor.

Figure 13:
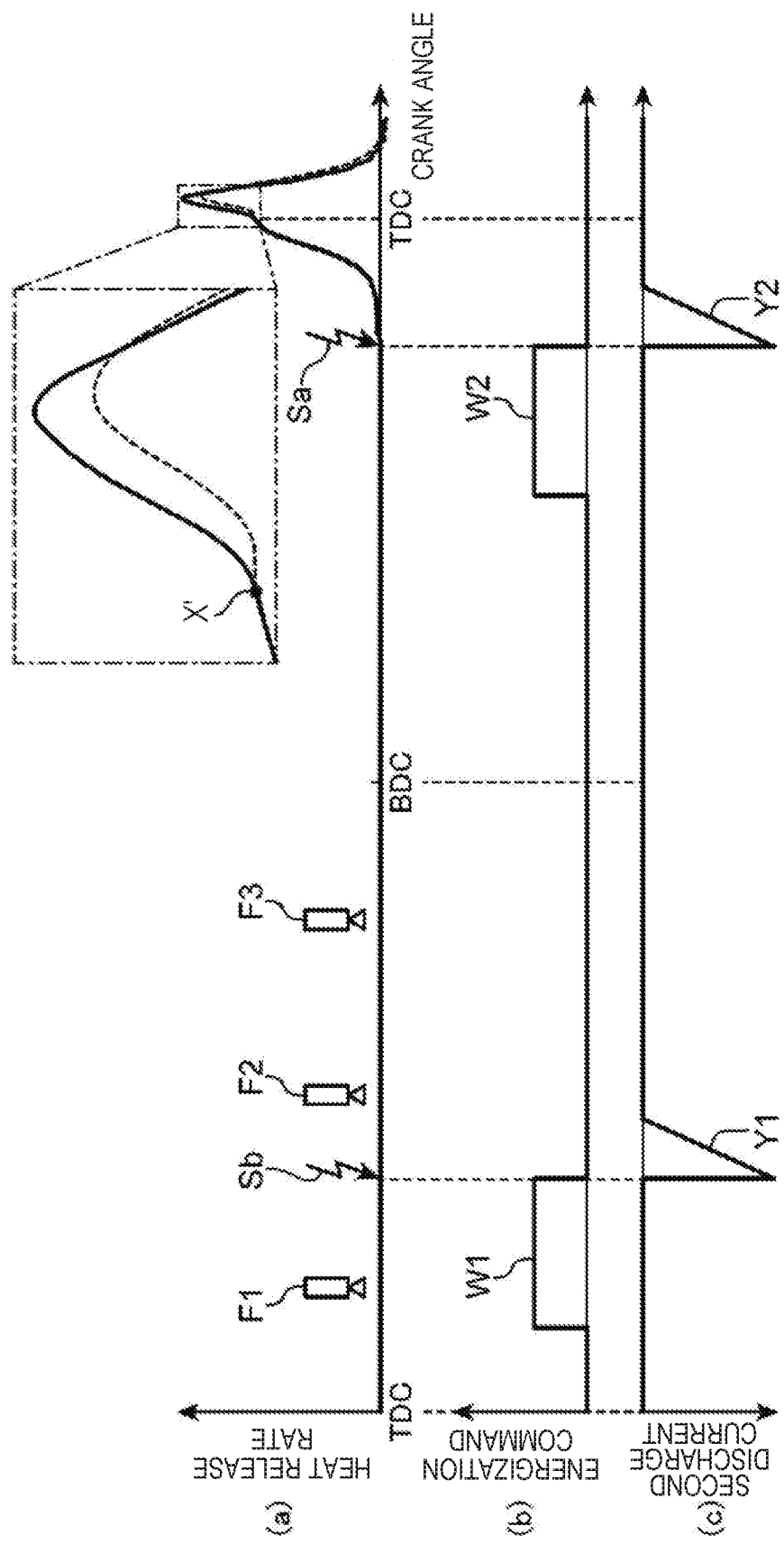
FIG. 13 is a time chart illustrating, along with a combustion waveform, an electrical state of the ignition plug when the preceding ignition and the normal ignition are performed.

FIG. 13 is a time chart in which an electrical state of the ignition plug 16 when the preceding ignition Sb and the normal ignition Sa are performed in the first subdivided range A11 is illustrated along with a combustion waveform, where Chart (a) illustrates a waveform of the rate of heat release by SPCCI combustion, Chart (b) illustrates a waveform of an energization command to the ignition plug 16, and Chart (c) illustrates a waveform of discharge current from the ignition plug 16. As illustrated by waveforms W1 and W2 in Chart (b) of this figure, current is supplied (energized) to the ignition plug 16 before each of the preceding ignition Sb and the normal ignition Sa. In the illustrated example, since the timing of the preceding ignition Sb is set in the middle period of an intake stroke and the timing of the normal ignition Sa is set near the advancing side of a compression top dead center (a late timing in the late period of the compression stroke), energizations W1 and W2 are started from a given timing in the intake stroke and a given timing in a compression stroke, respectively, which are slightly before the respective ignition timings. The energy accumulated in the capacitor by the energizations W1 and W2 is discharged from the electrodes of the ignition plug 16, when the energizations W1 and W2 are stopped. Therefore, the discharge current illustrated by waveforms Y1 and Y2 in Chart (c) occurs, and sparks (arc) are generated inside the combustion chamber 6.

Here, as already described, in this embodiment, the energy of the normal ignition Sa is the same as the energy of the preceding ignition Sb, and its value corresponds to the maximum energy which can be supplied by a single continuous discharge, i.e., the energy which can be obtained when the electric potential of the capacitor is raised to the maximum voltage. For this reason, before the start of the preceding ignition Sb and the normal ignition Sa, it is necessary to continue the energizations W1 and W2 until the electric potential of the capacitor reaches the maximum voltage. In other words, the energization time for the preceding ignition Sb equivalent to the waveform width of the energization W1 and the energization time for the normal ignition Sa equivalent to the waveform width of the energization W2 are set as a period of time required for raising the electric potential of the capacitor from zero to the maximum voltage.

As the energization W1 or W2 is stopped, the electrical energy accumulated in the capacitor is discharged from the electrodes of the ignition plug 16, and sparks (arc) are generated inside the combustion chamber 6. This discharge of sparks (electric discharge) is continued until the electric potential of the capacitor becomes substantially zero, and the discharge current from the ignition plug 16 decreases as a linear function. That is, when performing the preceding ignition Sb and the normal ignition Sa, the discharge current Y1 and Y2 transition so as to present a waveform of a substantially right angled triangular shape during a period from the start of the electric discharge at which the energizations W1 and W2 to the capacitor are stopped to the completion of the electric discharge at which the capacitor voltage becomes zero. The energy of the preceding ignition Sb and the normal ignition Sa corresponds to an area of the waveform of the substantially right angled triangle, and reaches the energy accumulated in the capacitor by the prior energizations W1 and W2, respectively. As already described, the energy of each of the preceding ignition Sb and the normal ignition Sa can be set to 100 mJ.

(6) Specific Operation of Intermittent Ignition

Figure 14:
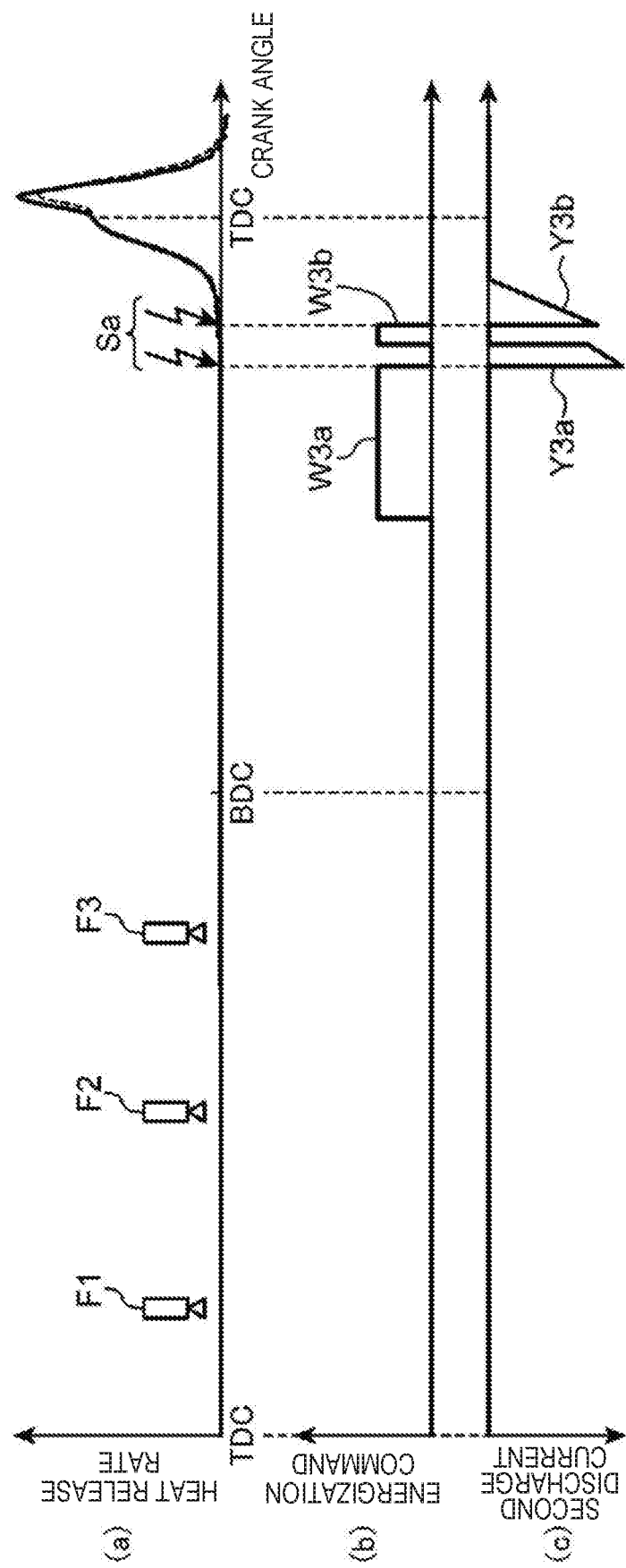
FIG. 14 is a time chart illustrating, along with the combustion waveform, the electrical state of the ignition plug when the normal ignition is intermittently performed.

Next, the intermittent ignition performed as the normal ignition Sa in the second subdivided range A12 is described. That is, in this embodiment, as described above, the intermittent ignition in which the electric discharge from the ignition plug 16 is temporarily suspended is performed as the normal ignition Sa in the second subdivided range A12 which is a part of the first operating range A1 on the high-load side. FIG. 14 is a time chart in which an electrical state of the ignition plug 16 when the intermittent ignition is performed is illustrated along with a combustion waveform. As illustrated in Chart (b) of this figure, a first energization W3a is performed before the normal ignition Sa (intermittent ignition) in the second subdivided range A12. This first energization W3a is continued for a period of time during which the electrical potential of the capacitor of the ignition plug 16 can be raised to the maximum voltage, and it is then stopped. Then, slightly after the first energization W3a, a second energization W3b is performed for a shorter period of time.

When the first energization W3a is stopped, sparks are discharged from the electrodes of the ignition plug 16 to generate a first discharge current Y3a (see Chart (c)). Note that this discharge of sparks (electric discharge) is suspended when the second energization W3b is started. In other words, the first discharge current Y3a is generated only during a period from the stopped timing of the first energization W3a to the started timing of the second energization W3b. Then, when the second energization W3b is stopped, sparks are again discharged from the ignition plug 16 to generate a second discharge current Y3b. This second discharge current Y3b is continued until the electric potential of the capacitor becomes substantially zero. Therefore, the electric discharge energy by the second discharge current Y3b becomes the sum total of the remainder of the accumulated energy of the capacitor by the first energization W3a (i.e., obtained by subtracting the electric discharge energy by the first discharge current Y3a from the accumulated energy), and the accumulated energy of the capacitor by the second energization W3b. In other words, the sum total electric discharge energy of the first discharge current Y3a and second discharge current Y3b is larger than the energy supplied by the first energization W3a (i.e., the energy obtained when the electric potential of the capacitor is raised to the maximum voltage) by the energy supplied by the second energization W3b. Moreover, since the electric discharge is suspended only during the second energization W3b, the time from the start to the end of the electric discharge becomes longer by the suspended time. Thus, an effect as if the generating time of sparks (arc) is substantially extended can be acquired. In addition, since the suspended time of the electric discharge is very short, the influence by the suspension is kept minimum.

(7) Operation and Effects

As described above, in this embodiment, when the engine is operated in the first operating range A1 where the engine load is low, the injector 15, the ignition plug 16, etc. are controlled so that the A/F-lean mixture gas having the air-fuel ratio higher than a stoichiometric air-fuel ratio carries out SPCCI combustion inside the combustion chamber 6, and the ignition operation by the ignition plug 16 in this first operating range A1 is variably set according to the engine speed. In detail, in the first subdivided range A11 of the first operating range A1 where the engine speed is the boundary speed Nx or lower and the load is the boundary load Lx or lower, the normal ignition Sa which generates sparks near a compression top dead center (at least the timing not deviating from the period from the later period of a compression stroke to the early period of an expansion stroke) and forcibly combusts the mixture gas (SI combustion), and the preceding ignition Sb which generates sparks in an intake stroke (in detail, in the middle period of the intake stroke) are performed by the ignition plug 16. On the other hand, in the second subdivided range A12 of the first operating range A1 on the high-load side of the first subdivided range A11, the preceding ignition Sb is suspended and only the normal ignition Sa is performed. According to such a configuration, there is an advantage that the SPCCI combustion which is fast in the combustion rate and excellent in thermal efficiency can be achieved, while securing the durability of the ignition plug 16.

That is, in this embodiment, during the operation in the first subdivided range A11, i.e., when the A/F-lean SPCCI combustion is performed under the condition where the engine speed and the load are relatively low, since the preceding ignition Sb is performed in the middle period of an intake stroke which is fully on the advanced side of the normal ignition Sa, the fuel component can be modified by the preceding ignition Sb to generate the intermediate product including OH radicals, etc., thereby improving thermal efficiency of the SPCCI combustion caused after the normal ignition Sa. The preceding ignition Sb at the timing which is in the middle period of an intake stroke and is sufficiently advanced from a compression top dead center does not substantially cause the flame propagation of the mixture gas because of the insufficient temperature, but a layer of the mixture gas which is raised in the temperature to the given temperature range of 850 K or higher and less than 1140 K is formed (high-temperature layer) around the sparks (arc) by the preceding ignition Sb. Then, the fuel component (hydrocarbon) included in the high-temperature layer cleaves to generate hydrogen peroxide ($H_2O_2$) and formaldehyde ($CH_2O$), and, for example, OH radicals are generated from these components. OH radicals are strong in oxidation and highly reactive. Therefore, when the intermediate product containing such OH radicals are generated inside the combustion chamber 6 after the preceding ignition Sb, the combustion rate of CI combustion, i.e., a speed of the combustion by the spontaneous chemical reaction of the fuel component, can be increased, even during the operation in the first subdivided range A11 where the ignitability of the mixture gas is not always appropriate, and therefore, thermal efficiency of the SPCCI combustion including the CI combustion can be improved.

In Chart (a) of FIG. 13, the waveform (solid line) of the rate of heat release when the preceding ignition Sb is performed in the middle period of the intake stroke as described above is illustrated comparing with the waveform (broken line) of the rate of heat release when the preceding ignition Sb is not performed. As apparent also from the comparison of the two combustion waveforms, the rising of the rate of heat release is more steep after the CI combustion is started (on the retarding side of a point X') in the case where the preceding ignition Sb is performed than in the case where the preceding ignition Sb is not performed, and therefore, it can be seen that the combustion rate of CI combustion is faster. Note that although a part of the intermediate product generated by the preceding ignition is consumed by SI combustion before CI combustion, since the intermediate product has already distributed widely in the combustion chamber 6 at the start timing of the SI combustion and the intermediate product remains also outside the area of SI combustion, the speeding-up of the CI combustion can be achieved without any problem by the action of the remained intermediate product.

On the other hand, since the preceding ignition Sb is suspended and only the normal ignition Sa is performed in the second subdivided range A12 on the high-load side of the first subdivided range A11, the durability of the ignition plug 16 can be prevented from being deteriorated by the excessive thermal load, etc. That is, in the second subdivided range A12, since the load is high and the total injection amount (as a result, the amount of heat release) of fuel increases, the in-cylinder temperature (the temperature inside the combustion chamber 6) tends to become high, and the ignitability of the mixture gas is secured comparatively appropriately. For this reason, it can be said that the combustion rate of CI combustion in the second subdivided range A12 is originally fast, and therefore, the significance of performing the preceding ignition Sb in such a second subdivided range A12 is less. On the other hand, in this embodiment, since the preceding ignition Sb is suspended in the second subdivided range A12, in other words, the preceding ignition Sb is performed only within the load range where the effect of the preceding ignition Sb can be obtained at the significant level, the thermal load of the ignition plug 16 can be reduced while totally improving thermal efficiency in the first operating range A1 where SPCCI combustion is performed, and therefore, the durability of the ignition plug 16 can fully be secured.

Here, according to the observation based on the research of the present inventors, θci which is the start timing of CI combustion may occasionally vary largely even in the second subdivided range A12 where it is considered that the appropriate ignitability (the increasing in the rate of CI combustion) can be obtained without being accompanied by the preceding ignition Sb. Since such a variation of θci leads to instability in the output torque, measures such as intentionally increasing the SI ratio are necessary, and the measures will cause a degradation in fuel efficiency. On the other hand, in this embodiment, since the intermittent ignition, which generates sparks intermittently by suspending the electric discharge from the ignition plug 16 for a very short period of time during the operation in the second subdivided range A12, is performed as the normal ignition Sa, the period of time from the start to the end of electric discharge becomes longer, and as a result, the effect as if the generating time of sparks (arc) is substantially extended can be acquired, thereby stabilizing SI combustion which is the first half part of SPCCI combustion. Since the probability of the start timing (θci) of CI combustion falling in a range near the intended timing (target θci) in the second subdivided range A12 becomes high and SPCCI combustion is fully stabilized, the fuel efficiency can be further improved.

Moreover, in this embodiment, since the energy and the timing of the preceding ignition Sb in the first subdivided range A11 are set constant regardless of the engine speed and the load, the control of the ignition plug 16 can be simplified, and the effect of the preceding ignition Sb (the improvement in thermal efficiency by the increasing in the rate of CI combustion) can be demonstrated at a significant level.

That is, the present inventors observed that the energy and the timing of the preceding ignition Sb in the first subdivided range A11 are set variably according to the engine speed and the load so that the effect of the preceding ignition Sb becomes the maximum effect. However, as a result of the examination, it was confirmed that the significant effect could be acquired at any operation point in the first subdivided range A11, if the energy and the timing of the preceding ignition Sb are fixed in the combination of Q1 and T1 illustrated in FIGS. 12A and 12B. In other words, if the energy of the preceding ignition Sb is always set as the maximum value Q1 (the maximum energy which can be supplied by a single continuous discharge) and the timing of the preceding ignition Sb is always set at the given timing T1 in the middle period of an intake stroke, it was confirmed that the effect of the preceding ignition Sb was acquired practically at the same level, even when the engine speed and the load were changed variously within the first subdivided range A11. Because of such a situation, the energy and the timing of the preceding ignition Sb in the first subdivided range A11 are set as the fixed values Q1 and T1 in this embodiment. Therefore, since it becomes unnecessary to change the control for energizing the ignition plug 16 for the preceding ignition Sb each time according to the engine speed and the load, the effect of improving thermal efficiency, etc. by the preceding ignition Sb can be acquired at the sufficient level, while simplifying the control of the ignition plug 16.

Here, as another discovery which can be derived from the examination described above, there is an observation that the efficiency of fuel property modification increases when the timing of the preceding ignition Sb is advanced as much as possible in an intake stroke. That is, from a viewpoint of acquiring the effect at the necessary level by the fuel property modification while holding down the energy consumption by the preceding ignition Sb as much as possible, it is desirable to perform the preceding ignition Sb as early as possible in an intake stroke, i.e., in the early period of the intake stroke. In more detail, it was understood that, if fuel is injected and the preceding ignition Sb is performed in the early period of the intake stroke, especially during the valve overlap period (the period during which both the intake valve 11 and the exhaust valve 12 open), the property modification of the sufficient amount of the fuel component can be carried out even with the comparatively low energy. However, since the early period of the intake stroke (especially, during the valve overlap period) is a period during which a gas flow inside the combustion chamber 6 is very strong, if the preceding ignition Sb is performed during such a timing, even though the energy consumption by the preceding ignition Sb can be reduced, uneven wear of electrodes of the ignition plug 16 resulting from the strong gas flow tends to occur, and therefore, the durability of the ignition plug 16 may be deteriorated significantly. That is, if the preceding ignition Sb is performed under the environment where the gas flow is strong like the early period of an intake stroke, the sparks (arc) discharged from the electrodes of the ignition plug 16 are deformed by the influence of the gas flow inside the combustion chamber 6, and the grounding points of the arc are concentrated on a narrow area in the electrodes, etc., thereby stimulating the wear of the electrodes of the ignition plug 16. In this embodiment, this is because the timing of the preceding ignition Sb is set not in the early period of a compression stroke but in the middle period.

However, if the timing of the preceding ignition Sb is delayed to the middle period of the compression stroke, the efficiency of the fuel property modification by the preceding ignition Sb itself is lowered. Thus, in this embodiment, the energy of the preceding ignition Sb is raised to the maximum value Q1 in order to compensate this problem. However, as a side effect of increasing the energy of the preceding ignition Sb to the maximum value Q1, the thermal load of the ignition plug 16 becomes excessive depending on the frequency of the preceding ignition Sb, and the durability may be adversely influenced. On the other hand, in this embodiment, since the preceding ignition Sb is suspended in the second subdivided range A12 of the first operating range A1 where the load is relatively high, the thermal load of the ignition plug 16 can be reduced, thereby reducing the deterioration in the durability of the ignition plug 16 to the minimum.

Moreover, in this embodiment, since the preceding ignition Sb is suspended and only the normal ignition Sa is performed in the third subdivided range A13 on the high-speed side of the first subdivided range A11, the frequency of the preceding ignition Sb can be reduced and the thermal load of the ignition plug 16 can be reduced, as well. That is, in the third subdivided range A13, since the engine speed is high and the number of combustions per unit time increases, there is a possibility that the temperature of the ignition circuitry of the ignition plug 16 may increase excessively to make the thermal load of the ignition plug 16 excessive, if the preceding ignition Sb is performed under such a condition. Moreover, in the third subdivided range A13 where the engine speed is high, since the gas flow inside the combustion chamber 6 becomes comparatively strong at the timing corresponding to the preceding ignition Sb (here, the middle period of an intake stroke), the uneven wear of the electrodes of the ignition plug 16 tends to occur because of the situation described previously (the localization of the grounding points of arc). On the other hand, since the increase in the thermal load of the ignition plug 16 and the eccentric abrasion of the electrodes which are described above are reduced when the preceding ignition Sb is suspended in the third subdivided range A13 like the above embodiment, the durability of the ignition plug 16 can fully be secured.

Moreover, in this embodiment, during the operation in the first operating range A1 where the A/F-lean SPCCI combustion is performed, since the timing of the normal ignition Sa by the ignition plug 16 is adjusted so that the SI ratio which is the ratio of the amount of heat release by SI combustion to the total amount of heat release in one cycle reaches the target SI ratio defined beforehand according to the engine operating condition, the ratio of CI combustion can be increased (i.e., the SI ratio is lowered) as much as possible within the range where, for example, combustion noise does not become excessive. This leads to increasing thermal efficiency by the SPCCI combustion as much as possible, with the aid of the effect of the fuel property modification by the preceding ignition Sb (increasing the rate of CI combustion).

(8) Modifications

Although in this embodiment the energy of the preceding ignition Sb is set as the maximum value Q1 (FIG. 12B) at any engine speed and load in the first subdivided range A11, the energy of the preceding ignition Sb may be reduced from the maximum value Q1, for example, under a condition where the engine water temperature detected by the water temperature sensor SN2 is high. That is, under the condition where the engine water temperature is high, since the ignitability of fuel becomes originally high, it can be considered that the rate of CI combustion becomes fast enough even if the amount of fuel component of which the property is modified by the preceding ignition Sb is less. Therefore, the energy of the preceding ignition Sb may be reduced from the maximum value Q1 on a condition of the engine water temperature becoming higher than a given threshold. In more detail, within a range of the engine water temperature from the lower-limit temperature (e.g., 70° C.) where SPCCI combustion is possible to a given threshold (e.g., 80° C.) higher than the lower-limit temperature, the energy of the preceding ignition Sb is set uniformly as the maximum value Q1, and when the engine water temperature becomes higher than the threshold, the energy of the preceding ignition Sb is reduced as the increasing amount of the engine water temperature with respect to the threshold becomes larger. Thus, the energy consumption by the preceding ignition Sb can be reduced, while maintaining the high thermal efficiency of SPCCI combustion.

Note that in the mode in which the energy of the preceding ignition Sb is variable as described above, the parameter for determining the energy is not limited to the engine water temperature described above, as long as it is a certain temperature parameter which increases as a warm-up of the engine progresses. For example, the temperature of the engine lubricating oil (oil temperature) and the wall surface temperature of the combustion chamber 6 may be used as the parameter. The "engine temperature" in the present disclosure is a concept which includes the engine water temperature, the oil temperature, and the wall surface temperature.

In the above embodiment, during the operation in the first subdivided range A11, although the preceding ignition Sb is performed after the first fuel injection F1 of each combustion cycle is finished (between the first fuel injection F1 and the second fuel injection F2) and in the middle period of an intake stroke, the timing of the preceding ignition Sb may be the timing at which it is sufficiently separated from the normal ignition Sa to the advancing side (e.g., 60° CA or more), and fuel is present inside the combustion chamber 6, and, for example, the preceding ignition Sb may be performed in the late period of an intake stroke, or may be performed in the early period or the middle period of a compression stroke. Further, the number of preceding ignitions is not limited to once in one cycle, and may be increased to twice or more. For example, instead of supplying the maximum energy (Q1) by a single preceding ignition Sb like the above embodiment, a preceding ignition of comparatively low energy may be performed at a plurality of timings from the middle period of an intake stroke to the middle period of a compression stroke.

In the above embodiment, although the preceding ignition Sb is performed in the first subdivided range A11 in addition to the normal ignition Sa, and the preceding ignition Sb is completely stopped (only the normal ignition Sa is performed) in the second subdivided range A12 on the high-load side of this range A11, the energy of the preceding ignition Sb may be set at least smaller in the second subdivided range A12 than the first subdivided range A11, and therefore, it is not necessary to completely stop the preceding ignition Sb (the energy of the preceding ignition Sb is set to zero). This is similar in the third subdivided range A13 on the high-speed side of the first subdivided range A11.

In the above embodiment, although the three fuel injections F1-F3 are performed in an intake stroke in the first operating range A1 (the first to third subdivided ranges A11-A13) where the A/F-lean SPCCI combustion is performed, the number of fuel injections in the first operating range A1 is not limited to three times, and may be set as once or twice, or may be set as four times or more. Moreover, the injection timing of fuel in the first subdivided range A11 may be the timing at which at least a part of the fuel to be injected in one combustion cycle may be present inside the combustion chamber 6 before the preceding ignition Sb, and therefore, it is also possible to inject some or all of the fuel in a compression stroke.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

6 Combustion Chamber
13 Intake VVT (Air Amount Adjusting Mechanism)
14 Exhaust VVT (Air Amount Adjusting Mechanism)
15 Injector
16 Ignition Plug
32 Throttle Valve (Air Amount Adjusting Mechanism)
53 EGR Valve (Air Amount Adjusting Mechanism)
102 Combustion Controlling Module
A1 First Operating Range (Specific Range)
A11 First Subdivided Range (First Range)
A12 Second Subdivided Range (Second Range)
Sa Normal Ignition
Sb Preceding Ignition

What is claimed is:

1. A control device for a compression ignition engine including a combustion chamber, an injector configured to inject fuel into the combustion chamber, and an ignition plug configured to ignite a mixture gas where the fuel injected from the injector is mixed with air, the control device comprising:

an air amount adjusting mechanism including at least a throttle valve, configured to adjust an amount of air introduced into the combustion chamber; and a processor configured to execute a combustion controlling module to control the injector, the ignition plug, and the air amount adjusting mechanism so that partial compression ignition combustion, in which spark ignition (SI) combustion of a portion of an air-fuel ratio (A/F)-lean mixture gas having an air-fuel ratio higher than a stoichiometric air-fuel ratio is performed by a jump-spark ignition using the ignition plug, and compression ignition (CI) combustion of the remaining mixture gas is performed by a self-ignition, is carried out in a specific range where an engine load is low, wherein in a first range of the specific range excluding at least a part of high-load side, the combustion controlling module causes the ignition plug to perform a normal ignition in which a spark is generated in a late period of a compression stroke or an early period of an expansion stroke to start the SI combustion, and a preceding ignition in which a spark is generated at an ignition timing included in an intake stroke or the compression stroke and earlier than the normal ignition by a given amount or more, and causes the injector to inject fuel at an injection timing where fuel is present inside the combustion chamber before the preceding ignition, wherein in a second range of the specific range where the engine load is higher than in the first range, the combustion controlling module at least performs the normal ignition and limits the execution of the preceding ignition; and wherein the combustion controlling module performs the preceding ignition in a middle period or a late period of the intake stroke so that a flame propagation of the mixture gas is not caused.

2. The control device of claim 1, wherein the combustion controlling module suspends the preceding ignition and only performs the normal ignition in the second range.

3. The control device of claim 2, wherein the combustion controlling module performs an intermittent ignition in which a spark is generated intermittently by suspending an electric discharge from the ignition plug for a predetermined period of time, as the normal ignition in the second range.

4. The control device of claim 1, wherein the combustion controlling module sets a spark energy of the preceding ignition in the first range constant, regardless of the engine load.

5. The control device of claim 1, wherein the combustion controlling module sets the timing of the preceding ignition constant in the first range, regardless of the engine load.

6. The control device of claim 5, wherein the preceding ignition and the normal ignition are performed by a single ignition plug having a single ignition circuitry, per each cylinder of the engine.

7. The control device of claim 1, wherein the combustion controlling module reduces a spark energy of the preceding ignition as an engine temperature increases, under a condition where the engine load is the same.

8. The control device of claim 1, wherein the combustion controlling module adjusts the timing of the normal ignition so that an SI ratio that is a ratio of an amount of heat release by the SI combustion to a total amount of heat release in one cycle reaches a target value determined beforehand.

9. The control device of claim 1, wherein a plurality of parameters, including an injection amount, the injection timing, the ignition timing, and an exhaust gas recirculation (EGR) rate are controlled so as to realize a target SI ratio which is a ratio of an amount of heat release by SI combustion to a total amount of heat release by SPCCI (SPark Controlled Compression Ignition) combustion.

10. The control device of claim 3, wherein
the electric discharge is a first discharge current; and
during the intermittent ignition:
a first energization is performed on the ignition plug;
the first discharge current is generated following the first energization of the ignition plug;
the first discharge current is suspended for the predetermined period of time, a second energization being performed on the ignition plug while the first discharge current is suspended; and
a second discharge current is generated following the second energization of the ignition plug.

* * * * *